United States Patent
Halbritter

(10) Patent No.: US 9,382,070 B2
(45) Date of Patent: Jul. 5, 2016

(54) CONVEYOR AND METHOD TO CONVEY ANIMAL PRODUCTS IN AN AGRICULTURAL BUSINESS

(71) Applicant: BIG DUTCHMAN INTERNATIONAL GMBH, Vechta (DE)

(72) Inventor: Lars Halbritter, Lohne (DE)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 170 days.

(21) Appl. No.: 14/061,361

(22) Filed: Oct. 23, 2013

(65) Prior Publication Data
US 2014/0114468 A1  Apr. 24, 2014

(30) Foreign Application Priority Data

Oct. 24, 2012 (DE) ............... 20 2012 010 170 U
Mar. 1, 2013 (DE) ............... 20 2013 001 935 U

(51) Int. Cl.
| | |
|---|---|
| *G06F 7/00* | (2006.01) |
| *B65G 15/64* | (2006.01) |
| *B65G 39/16* | (2006.01) |

(52) U.S. Cl.
CPC .............. *B65G 15/64* (2013.01); *B65G 39/16* (2013.01)

(58) Field of Classification Search
None
See application file for complete search history.

(56) References Cited

U.S. PATENT DOCUMENTS

| | | | |
|---|---|---|---|
| 503,664 | A | 8/1893 | Jones |
| 2,074,383 | A | 3/1937 | Funk |
| 2,149,686 | A | 3/1939 | Rivenburgh |
| 2,808,029 | A | 10/1957 | Geerlings |
| 2,842,096 | A | 7/1958 | Bradfield |
| 2,884,899 | A | 5/1959 | Jackes et al. |
| 2,969,867 | A | 1/1961 | McClelland |
| 3,102,511 | A | 9/1963 | Atcheson |
| 3,139,065 | A | 6/1964 | Willauer, Jr. |
| 3,145,793 | A | 8/1964 | Ray |
| 3,215,252 | A | 11/1965 | Wilkes |
| 3,388,690 | A | 6/1968 | Hostetler |
| 3,427,929 | A | 2/1969 | Dawson |
| 3,511,215 | A | 5/1970 | Myers |

(Continued)

FOREIGN PATENT DOCUMENTS

| | | |
|---|---|---|
| AU | 1715083 A | 3/1984 |
| CH | 485202 A | 1/1970 |

(Continued)

*Primary Examiner* — Yolanda Cumbess
(74) *Attorney, Agent, or Firm* — Price Heneveld LLP

(57) ABSTRACT

The invention relates to a conveyor and a method to convey animal products in an agricultural business. Such a conveyor comprises a conveyor belt, a belt drive to drive the conveyor belt in at least one conveying direction, and a sensor to record a deviation of a position of a conveyor belt edge. The sensor is designed and arranged to output a deviation signal when the position of the conveyor belt edge deviates by a predetermined value from the target position. Furthermore, a correction device and a control unit are provided, whereby the correction device is designed and arranged to change the belt drive orientation dependent on a correction signal and whereby the control unit is designed to generate a correction signal dependent on the deviation signal and to output it to the correction device.

19 Claims, 14 Drawing Sheets

(56) References Cited

U.S. PATENT DOCUMENTS

| | | | |
|---|---|---|---|
| 3,696,584 A | 10/1972 | Rickard | |
| 3,722,743 A | 3/1973 | Atchley | |
| 3,738,077 A | 6/1973 | Leach | |
| 3,759,368 A | 9/1973 | Rose et al. | |
| 3,770,107 A | 11/1973 | Michelbach | |
| 3,811,412 A | 5/1974 | Murto et al. | |
| 3,898,435 A | 8/1975 | Pritchard et al. | |
| 3,911,868 A | 10/1975 | Brembeck et al. | |
| 3,966,049 A | 6/1976 | van den Berg | |
| 3,968,904 A | 7/1976 | Neville | |
| 4,070,990 A | 1/1978 | Swartzendruber | |
| 4,086,998 A | 5/1978 | van der Schoot | |
| RE29,944 E | 3/1979 | Hyer et al. | |
| 4,159,696 A | 7/1979 | Martin | |
| 4,199,051 A | 4/1980 | Kimberley | |
| 4,216,742 A | 8/1980 | Kirchhofer | |
| 4,226,211 A | 10/1980 | Barrentine | |
| 4,253,120 A | 2/1981 | Levine | |
| 4,345,682 A | 8/1982 | White et al. | |
| 4,348,988 A | 9/1982 | Lawson | |
| 4,401,057 A | 8/1983 | Van Gilst | |
| 4,416,218 A | 11/1983 | Holz | |
| 4,418,773 A | 12/1983 | Finet et al. | |
| 4,476,811 A | 10/1984 | Swartzendruber | |
| 4,527,513 A | 7/1985 | Hart et al. | |
| 4,542,808 A | 9/1985 | Lloyd et al. | |
| 4,552,095 A | 11/1985 | Segalla | |
| 4,575,993 A | 3/1986 | Meyn | |
| 4,603,657 A | 8/1986 | Peckskamp | |
| 4,675,520 A | 6/1987 | Harrsen et al. | |
| 4,676,197 A | 6/1987 | Hoover | |
| 4,846,337 A | 7/1989 | Kuhlmann | |
| 4,863,009 A * | 9/1989 | Winkel | B65G 43/10 |
| | | | 177/50 |
| 4,868,901 A | 9/1989 | Kniskern et al. | |
| 4,959,040 A | 9/1990 | Gardner | |
| 4,995,343 A | 2/1991 | Cole et al. | |
| 5,007,380 A | 4/1991 | Badia et al. | |
| 5,046,570 A | 9/1991 | Emme et al. | |
| 5,092,274 A | 3/1992 | Cole et al. | |
| 5,097,797 A | 3/1992 | Van Zee et al. | |
| 5,101,765 A | 4/1992 | Manfrin | |
| 5,101,766 A | 4/1992 | Runion | |
| 5,113,797 A | 5/1992 | van Daele | |
| 5,119,893 A | 6/1992 | Jost | |
| 5,165,514 A | 11/1992 | Faulkner | |
| 5,222,589 A | 6/1993 | Gordon | |
| 5,232,080 A | 8/1993 | Van Essen et al. | |
| 5,275,131 A | 1/1994 | Brake et al. | |
| 5,304,745 A | 4/1994 | Rusk et al. | |
| 5,311,839 A | 5/1994 | Pollock et al. | |
| 5,311,977 A | 5/1994 | Dean et al. | |
| 5,365,717 A | 11/1994 | McKinlay | |
| 5,406,907 A | 4/1995 | Hart | |
| 5,435,267 A | 7/1995 | Patterson | |
| 5,462,017 A | 10/1995 | Pollock et al. | |
| 5,490,591 A | 2/1996 | Faulkner | |
| 5,497,730 A | 3/1996 | van Daele | |
| 5,551,822 A | 9/1996 | Pippin et al. | |
| 5,603,285 A | 2/1997 | Kleinsasser | |
| 5,642,688 A | 7/1997 | Bannier et al. | |
| 5,718,187 A | 2/1998 | Pollock et al. | |
| 5,736,682 A | 4/1998 | Heitmann et al. | |
| 5,762,021 A | 6/1998 | Horwood et al. | |
| 5,765,503 A | 6/1998 | van Daele | |
| 5,778,821 A | 7/1998 | Horwood et al. | |
| 5,794,562 A | 8/1998 | Hart | |
| 5,875,733 A | 3/1999 | Chen | |
| 5,884,581 A | 3/1999 | Vandaele | |
| 5,927,232 A | 7/1999 | Pollock | |
| 5,941,193 A | 8/1999 | Cole | |
| 5,957,083 A | 9/1999 | Cheng | |
| 5,964,185 A | 10/1999 | DeBonne et al. | |
| 5,967,083 A | 10/1999 | Kleinsasser | |
| 6,050,220 A | 4/2000 | Kimmel et al. | |
| 6,066,809 A | 5/2000 | Campbell et al. | |
| 6,152,078 A | 11/2000 | Romeu Guardia | |
| 6,173,676 B1 | 1/2001 | Cole | |
| 6,211,470 B1 | 4/2001 | Beran et al. | |
| 6,223,552 B1 | 5/2001 | Zimmerbauer et al. | |
| 6,317,656 B1 | 11/2001 | Kira | |
| 6,382,404 B1 | 5/2002 | Guldenfels | |
| 6,383,068 B1 | 5/2002 | Tollett et al. | |
| 6,394,031 B1 | 5/2002 | Moller | |
| 6,401,936 B1 | 6/2002 | Isaacs et al. | |
| 6,407,523 B1 * | 6/2002 | Allan | B65G 43/02 |
| | | | 198/323 |
| 6,412,439 B1 | 7/2002 | Otto-Lubker | |
| 6,470,826 B2 | 10/2002 | Thuline | |
| 6,484,886 B1 | 11/2002 | Isaacs et al. | |
| 6,539,893 B1 | 4/2003 | Otto-Lubker | |
| 6,625,960 B1 | 9/2003 | Nambu | |
| 6,655,317 B1 | 12/2003 | Steudler, Jr. et al. | |
| 6,732,851 B2 | 5/2004 | Wienken | |
| 6,779,488 B2 | 8/2004 | Corti et al. | |
| 7,191,895 B2 | 3/2007 | Zeitler et al. | |
| 7,228,817 B2 | 6/2007 | Busse | |
| 7,552,697 B2 | 6/2009 | Busse | |
| 7,573,567 B2 | 8/2009 | Hershtik | |
| 7,878,391 B2 | 2/2011 | Kalkhoff | |
| 8,127,916 B2 | 3/2012 | Mix | |
| 8,168,897 B2 * | 5/2012 | Sudkamp | 177/16 |
| 8,360,230 B2 | 1/2013 | Rompe | |
| 8,590,695 B2 | 11/2013 | Moreno Rueda | |
| 2002/0152965 A1 | 10/2002 | Turner | |
| 2003/0192774 A1 | 10/2003 | Cotter et al. | |
| 2004/0112713 A1 | 6/2004 | Haan et al. | |
| 2005/0063513 A1 | 3/2005 | Hsieh et al. | |
| 2005/0150747 A1 | 7/2005 | Menendez | |
| 2005/0217967 A1 | 10/2005 | Scott | |
| 2006/0039583 A1 | 2/2006 | Bickert et al. | |
| 2008/0251357 A1 | 10/2008 | Kawakami | |
| 2009/0020395 A1 | 1/2009 | Accettura | |
| 2009/0045029 A1 | 2/2009 | Deur | |
| 2010/0294624 A1 * | 11/2010 | Warner | B65G 43/02 |
| | | | 198/502.2 |
| 2011/0062000 A1 | 3/2011 | Yamamoto | |
| 2012/0160637 A1 | 6/2012 | Itoh et al. | |
| 2012/0181150 A1 * | 7/2012 | Damm | 198/617 |
| 2013/0014704 A1 | 1/2013 | Kuking | |
| 2013/0092512 A1 | 4/2013 | Buschmann et al. | |
| 2013/0206549 A1 * | 8/2013 | Clevers | G03G 15/167 |
| | | | 198/807 |
| 2013/0299317 A1 | 11/2013 | Moller | |

FOREIGN PATENT DOCUMENTS

| | | |
|---|---|---|
| DE | 525996 | 6/1931 |
| DE | 1820785 | 8/1960 |
| DE | 1124872 | 3/1962 |
| DE | 1406150 | 3/1969 |
| DE | 7102326 | 9/1971 |
| DE | 2155120 | 5/1972 |
| DE | 2157774 | 5/1973 |
| DE | 2313663 | 10/1974 |
| DE | 2350555 | 4/1975 |
| DE | 118839 | 3/1976 |
| DE | 2612594 | 9/1977 |
| DE | 2802542 | 7/1979 |
| DE | 3138748 | 4/1983 |
| DE | 3326706 | 2/1984 |
| DE | 3332240 | 3/1985 |
| DE | 3419883 | 11/1985 |
| DE | 3445429 | 6/1986 |
| DE | 3525460 C1 | 2/1987 |
| DE | 3607858 A1 | 9/1987 |
| DE | 4036112 A1 | 5/1992 |
| DE | 4305559 A1 | 8/1994 |
| DE | 4411776 A1 | 10/1995 |
| DE | 19546626 A1 | 6/1997 |
| DE | 19607258 A1 | 8/1997 |
| DE | 19707155 A1 | 8/1997 |
| DE | 19807231 A1 | 9/1999 |
| DE | 29912821 U1 | 11/1999 |

(56) References Cited

FOREIGN PATENT DOCUMENTS

| | | |
|---|---|---|
| DE | 19851793 A1 | 5/2000 |
| DE | 19906916 A1 | 8/2000 |
| DE | 101 06 206 | 8/2002 |
| DE | 10164100 C1 | 4/2003 |
| DE | 10164122 C1 | 5/2003 |
| DE | 20315118 U1 | 2/2004 |
| DE | 102 48 875 | 4/2004 |
| DE | 10255072 A1 | 6/2004 |
| DE | 69924866 T2 | 3/2006 |
| DE | 2006003445 | 8/2007 |
| DE | 2006004894 | 8/2007 |
| DE | 202006007875 U1 | 10/2007 |
| DE | 202007008362 U1 | 10/2007 |
| DE | 202007009477 U1 | 10/2007 |
| DE | 202008003498 U1 | 10/2008 |
| DE | 102009055952 A1 | 6/2011 |
| DE | 202010016688 U1 | 5/2012 |
| DE | 202012004330 U1 | 7/2012 |
| DE | 202012004008 U1 | 8/2012 |
| DE | 202012010170 U1 | 3/2014 |
| DE | 202012010693 U1 | 3/2014 |
| DE | 202012010694 U1 | 3/2014 |
| DE | 202013001238 U1 | 7/2014 |
| DE | 202013010980 U1 | 4/2015 |
| DE | 202015102303 U1 | 7/2015 |
| EA | 2010 70867 | 2/2011 |
| EP | 0287874 | 10/1988 |
| EP | 0105571 B1 | 6/1989 |
| EP | 0387242 | 9/1990 |
| EP | 0414487 | 2/1991 |
| EP | 0421553 | 4/1991 |
| EP | 0 718 218 A2 | 6/1996 |
| EP | 0 891 704 | 1/1999 |
| EP | 1 077 026 | 2/2001 |
| EP | 1145631 A1 | 10/2001 |
| EP | 1306326 A1 | 5/2003 |
| EP | 0892254 B1 | 9/2003 |
| EP | 1 570 732 | 9/2005 |
| EP | 1856971 A2 | 5/2007 |
| EP | 2045198 | 10/2007 |
| EP | 2 134 164 | 9/2008 |
| EP | 2 003 415 | 12/2008 |
| EP | 1671901 A1 | 12/2008 |
| EP | 2 045 198 A1 | 4/2009 |
| EP | 2377787 | 4/2010 |
| EP | 2 377 787 A1 | 10/2011 |
| EP | 2 850 927 | 3/2015 |
| ES | 2449667 | 3/2014 |
| FR | 1129736 | 1/1957 |
| FR | 2030824 | 11/1970 |
| FR | 2322809 | 4/1977 |
| FR | 2483652 | 12/1981 |
| FR | 2780247 A1 | 12/1999 |
| GB | 856296 | 12/1960 |
| GB | 1021571 A | 3/1966 |
| GB | 1022509 A | 3/1966 |
| GB | 1237284 A | 6/1971 |
| GB | 1406164 A | 9/1975 |
| GB | 2047649 A | 12/1980 |
| GB | 2080663 A | 2/1982 |
| GB | 2 086 593 | 5/1982 |
| GB | 2107268 | 4/1983 |
| GB | 2125756 A | 3/1984 |
| GB | 2226130 A | 6/1990 |
| JP | S5889508 | 11/1981 |
| JP | S 5889508 | 5/1983 |
| JP | S6145819 | 3/1986 |
| JP | 11079345 A | 3/1999 |
| JP | 11139526 A | 5/1999 |
| JP | 2000235005 A | 8/2000 |
| JP | 2001-27612 A | 1/2001 |
| JP | 2001287710 A | 10/2001 |
| JP | 2003346124 A | 12/2003 |
| JP | 2007175027 A | 7/2007 |
| NL | 8002232 A | 11/1981 |
| NL | 9400025 | 8/1995 |
| NL | 1037320 | 9/2009 |
| NL | 1037320 C | 5/2011 |
| NL | WO 2012045622 A1 * | 4/2012 ........... G03G 15/167 |
| RU | 2129303 C1 | 4/1999 |
| SU | 1483470 A1 | 5/1989 |
| WO | 9743733 A1 | 11/1997 |
| WO | 2004004319 A1 | 1/2004 |
| WO | 2005109111 | 5/2004 |
| WO | 2005 109111 A1 | 11/2005 |
| WO | 2009 092130 A1 | 7/2009 |
| WO | 2011136644 A1 | 11/2011 |
| WO | WO 2012045622 A1 * | 4/2012 |
| WO | 2012122597 | 9/2012 |

* cited by examiner

CONVEYOR AND METHOD TO CONVEY ANIMAL PRODUCTS IN AN AGRICULTURAL BUSINESS

CROSS REFERENCE TO FOREIGN PRIORITY APPLICATION

The present application claims the benefit under 35 U.S.C. §119(b) of German Application No. 20 2013 001 935.2, filed Mar. 1, 2013, entitled "Conveyor and Method to Convey Animal Products in an Agricultural Business," and German Application No. 20 2012 010 170.6, filed Oct. 24, 2012, entitled "Conveyor and Method to Convey Animal Products in an Agricultural Business."

FIELD OF THE INVENTION

The invention relates to a conveyor and method to convey animal products in an agricultural business as well as a drive unit for such a conveyor.

BACKGROUND OF THE INVENTION

Furthermore, the invention relates to a method to convey animal products in an agricultural business by means of a conveyor.

Animal products are produced in agricultural business, in particular stables. In modern, high-technologies stables, the environmental conditions of the animals are optimized to make a species-appropriate and simultaneously efficient production possible. In this regard, animal products shall mean in particular products from poultry farming, such as eggs or meat, e.g., also whole animals, such as broiler chickens. However, by-products from this production, such as animal feces, which are generated in breeding, egg production or meat production, such as the fattening of broilers, are understood as animal products.

Conveyors to convey animal products, mostly with an endless belt and a belt drive, which drives the conveyor belt in at least one conveying direction, are a component of modern stables. Such conveyor belts can also be called rope-belt or belt conveyors. They serve in particular to quickly and reliably evacuate and move animal products from different livestock systems (small group, aviary, cage, etc.).

This type of livestock and conveying systems are usually designed to have multiple levels, while the levels can be arranged vertically above each other, but also laterally offset above each other in stables.

In the case of conveyors to convey feces, it can additionally be provided that the feces be aired so as to dry it or to dry it in separate drying systems, in which the initially referenced conveyors can also be used.

It is a problem with existing conveyors that an irregular initial tension and/or an irregular load of the conveyor belt can result in "drifting", whereby a conveyor belt no longer runs exactly on an intended track, but deviates from it laterally. Thus, the edges of the conveyor belt can, for example, get into contact with the lateral tracks, which can result in rubbing or, respectively, chafing of the conveyor belt and consequently to damage or even destruction of the conveyor belt, for example by a tear of the conveyor belt. However, in modern stables with corresponding livestock systems, a repair or an exchange of a conveyor belt is associated with significant work effort and an impact on both the animals and production.

Such an irregular load of the conveyor belt can in particular be caused by the uneven or, respectively, irregular loading of the conveyor belt with animal products. Currently, these problems are significantly increasing, since especially modern farming systems and an increasing significance of free range farming systems with a larger space for the animals cause a significantly more uneven distribution, e.g., of feces, on the conveyor belts.

SUMMARY OF THE INVENTION

It is therefore a first objective of the present invention to provide an apparatus and a method for conveying animal products in an agricultural business so as to reduce or remove one or several of the referenced disadvantages. It is in particular an objective of the present invention to provide an apparatus and a method to convey animal products in an agricultural business so as to improve the operating properties of a conveyor.

Existing conveying systems can perform maximum traction force to the conveyor belt depending on the construction embodiment of the belt drives. The mass or the quantity of the animal products on the conveyor belt and the coefficient of friction of the conveyor belt against the supporting substructure, as well as conveyor belt bottom joists and/or conveyor belt lateral supports work against this traction force. With increasing load of the conveyor belt with animal products, an overload of the conveyor belt can occur, with the consequence that the drive power put on the conveyor belt by the belt drive, in particular traction force, is not sufficient to drive the conveyor belt in at least one conveying direction. In this case, the further transport and/or the removal of the animal products with the conveyor belt is no longer possible. At the same time, such an overload of the conveyor belt is not or only reversible with difficulty, since the animal products, such as eggs, feces or broilers have actually landed on the conveyor belt for the purpose of removal and can't and/or are not supposed to be returned to their original location.

This type of overload can occur when the conveyor is used for the removal of feces, for example, if the intervals of purgation are too long. Generally, purgation is carried out in daily intervals depending on the number of animals in the livestock facility above the conveyor belt and therefore depending on the amount of feces per day and meter. For example, this can be necessary on a daily basis. However, most of the time, a two-day, three-day or n-day purgation is practiced. Here, the whole length of the conveying system is cleaned of feces, for example, or a certain partial length individually, for example, a third of the length of the conveying system. The economical working interest of the farmer is a purgation interval that is as long as possible. The amounts of feces accrued in long purgation intervals, however, can be so large that an unwanted overload of the conveyor belt occurs, with the consequence of a standstill of the conveying system.

From the farmer's view, another reason for a purgation interval that is as long as possible is that in an installed feces ventilation, the feces can be ventilated on the conveyor belt over a longer time period and can therefore be dried. Higher dry substance contents reduce the transformation of urea into ammonia, which contributes to the improvement of the stable environment and the reduction of ammonia emissions into the environment. The drying effect reduces the mass of the feces on the conveyor belt, which may facilitate longer purgation intervals. For example, due to interruptions, it can, however, be necessary to clean the feces in shorter intervals, such as after a leakage of the water supply for the animals. In such a case, water can leak onto the conveyor belt and accordingly re-increase the mass of feces. An overload of the conveyor belt is particularly apparent if the conveyor belt stands still, since the belt drive is no longer able to drive the conveyor belt in at least one conveying direction. In such a situation, the feces or other animal products must then be unloaded manually from the conveyor belt.

In another field of application, conveying systems are used to remove entire animals, such as broilers, with the use of the conveyor belt. Here, the bottom of the broiler's stable structure is opened in the way that the animals move to the conveyor belt and are removed. An overload of the conveyor belt can occur in this field of application in particular in the way that the workers in charge of opening the bottoms of the livestock facilities add more animal material per time unit to the conveyor belt than it [the conveyor belt] can move in the same time unit. The overload of the conveyor belt can have the consequence in this case as well that the drive power of the belt drive is not sufficient for driving the conveyor belt and/or slack occurs between the conveyor roller of the belt drive and the conveyor belt and the conveyor belt must be manually unloaded.

It is therefore the second objective of the present invention to provide an apparatus and a method for conveying animal products in an agricultural business so as to reduce or remove one or several of the referenced disadvantages. It is in particular an objective of the present invention to provide an apparatus and a method for conveying animal products in an agricultural business so as to prevent or reduce the overload of a conveyor.

According to the invention, the first and/or second objective is solved by a conveyor for conveying animal products in an agricultural business, with said conveyor comprising a conveyor belt, a belt drive to drive the conveyor belt in at least one conveying direction, a sensor to record a deviation in the position of an edge of the conveyor belt, which is designed and arranged to output a deviation signal when the position of the edge of the conveyor belt deviates by a specified value from a target position, a correction device, which is designed and arranged to change the alignment of the belt drive dependent on a correction signal, and a control unit, which is designed and arranged to generate a correction signal dependent on the deviation signal and to output it to the correction device.

The invention is, inter alia, based on the finding that an automatic correction of the conveyor belt course decreases or eliminates several disadvantages of existing solutions and that such an automatic correction can be achieved through the above-mentioned features. It is provided that the actual correction of a deviating conveyor belt course is achieved through a correction device which changes the orientation of the belt drive. Due to such a change in the orientation of the belt drive, the conveyor belt course can be corrected in such a way that the edges of the conveyor belt run corresponding to a target position. In this process, the orientation of the belt drive can, in particular, be a position change of the belt drive on one level parallel to the conveying direction.

A control unit generating a corresponding control signal and outputting it to the correction device serves to control the correction device. For this purpose, the control unit is preferably on the one hand connected to the correction device and, on the other hand, with a sensor.

This sensor serves to detect a course of the conveyor belt that deviates from the target course by recording a deviation of the position of one of the two edges of the conveyor belt. As soon as the sensor determines such a deviation, i.e., a course of the edge that deviates from the target course by a certain amount or more, the sensor generates a corresponding deviation signal and outputs this to the control unit. The predetermined value, by which the position of a conveyor belt edge deviates from a target position, preferably equals less than 20 millimeter, for example in particular when forked light barriers between 10 and 20 millimeters, in particular 11, 12, 13, 14, 15, 16, 17, 18 or 19 millimeters, are used. When inductive and/or ultrasound sensors are used, predetermined values of less than 10 millimeter can also be preferred, for example 1, 2, 3, 4, 5, 6, 7, 8 or 9 millimeters.

The suitability of conveyors to covey animal products in an agricultural business requires that the complete conveyor system, in particular also its individual elements, be developed for the high level of requirements in a stable. For example, the impact caused by contamination, such as dust, feces or feathers, is very high in a stable, as are the requirements on resistance to chemicals, such as in regard to cleaning or disinfecting agents used in the cleaning of stables. Furthermore, when conveying animal products in an agricultural business, it has to be assumed that the conveyor belt itself, in particular also its edges, are loaded with the animal products and/or contaminants. This places particularly high demands on suitable sensors to record a deviation of the position of a conveyor belt edge, since, on the one hand, the sensor or, respectively, a detection area of the sensor itself, can be contaminated and, furthermore, the conveyor belt edge to be monitored can also be contaminated or loaded with animal products.

The conveyor described herein has the advantage that the position of the conveyor belt edge can automatically be recorded continuously or in regular intervals and, in the case of a deviation of the position, an automatic correction can be performed directly so that a longer contact of the running conveyor belt with lateral guides or other elements and a corresponding damage or destruction of the conveyor belt can be decreased or completely avoided.

A correction of the conveyor belt course through a change of the orientation of the belt drive has the further advantage that the correction of the conveyor belt course can be made independent of the loading condition, i.e., also in the case of a conveyor loaded with animal products.

Preferably, the belt drive is designed as a bilaterally supported, powered drive roll. Furthermore, it is preferred that the correction device be designed and arranged to change the orientation of the belt drive through a position change of a belt drive bearing, in particular a horizontal shift in or contrary to the conveying direction.

An endless conveyor belt with an upper run, which conveys animal products, and with a lower run, has, for example, a drive roll on the out-feed side and a return pulley on the opposite side. Assisted by pressure rolls, the conveyor belt can be pushed onto the drive roll so that a high pressing force and therefore a corresponding friction is generated between the conveyor belt and the drive roll and the conveyor belt is driven by the rotation of the drive roll in at least one conveying direction. Preferably the drive roll is bilaterally supported, for example in a drive housing. Furthermore, scrapers can be provided for on the drive roll which serves to clean the conveyor belt. Preferably, the conveyor belt can be driven in more than one conveying direction, such as in two conveying directions which oppose one another. The belt drive, in particular a drive roll, can preferably be designed to be able to rotate in respectively different directions. More than one belt drive can be provided for; in particular, a conveyor belt for feces can have several belt drives.

An adjustment mechanism can be present for a position change of a belt drive bearing, such as in the form of an adjustment plate or a slider plate to house a bearing of the belt drive. Subsequently, this adjustment mechanism is moved by the correction device in such a way that a position change of the belt drive bearing occurs, which can cause the intended course correction of the conveyor belt.

In particular, it may be provided that the correction device has a linear drive which can generate the position change of a belt drive bearing, in particular a horizontal shift in or opposite to the conveyor device. For example, the correction device can be implemented as a gear motor, preferably with a trapezoidal screw spindle and a flange plate with a corresponding internal thread.

In a preferred further embodiment, the sensor can be designed as an optical, an acoustic, a mechanic, a capacitive or an inductive sensor. Furthermore, the sensor can be designed to output a digital or an analog deviation signal. An acoustic sensor designed as an ultrasound detector has, for example, an analog signal output, while inductive or optical sensors supply a digital signal. The design of the sensor based on laser technology, such as a light barrier, is particularly preferred. A mechanical sensor can, for example, be designed as a feeler.

Especially preferred is the use of a forked light barrier as a sensor with a red light laser as the sensor and a photo diode as the receiver. Such a sensor is especially robust and not sensitive to dirt, therefore being particular suitable for the present scope of application.

Furthermore, it can be preferred that the conveyor belt have a preferably continuous marking in the area of the edge and that the sensor be designed to determine a deviation of the conveyor belt edge based on the marking. For example, the marking can be designed as a metal band that preferably runs parallel to the edge, which is suitable to be recognized by an inductive sensor. Such an embodiment has the advantage that a deviation can be recognized very precisely and, furthermore, a sensor can record a deviation in different directions.

In another preferred further embodiment, it is provided that the sensor is arranged in such a way that a detection area of the sensor is arranged in an inclined manner. In particular, an incline, preferably to the horizontal line by at least 10 degrees, at least 20 degrees, at least 30 degrees, at least 40 degrees, at least 45 degrees, at least 50 degrees, at least 60 degrees, at least 70 degrees, or at least 80 degrees is preferred. Furthermore, an incline, preferably to the horizontal line by at the most 10 degrees, at the most 20 degrees, at the most 30 degrees, at the most 40 degrees, at the most 45 degrees, at the most 50 degrees, at the most 60 degrees, at the most 70 degrees or at the most 80 degrees to the horizontal line, can also be preferred. Especially preferred are incline areas which result from the above referenced different possible combinations of minimum and maximum incline limits. Particularly preferred is an incline in an area of 25 to 65 degrees, in particular between 30 and 60 degrees.

Such an inclined sensor arrangement is of particular advantage, since in the case of an incline of the sensor, in particular of the detection area of the sensor, contaminations glide easier off the detection area or, respectively, stick less to it and thus contaminate the detection area less or, respectively, at a slower rate. Such an inclined sensor arrangement is in particular preferred in the embodiment of the sensor as a forked light barrier.

Furthermore, it is preferably provided that a protective device, in particular a dirt scraper, be arranged in the conveying direction in front of the sensor to reduce the contamination of a detection area of the sensor. In this way, an additional entering of dirt and/or animal products on the sensor and, in particular, onto the detection area of the sensor can be reduced or avoided.

Pursuant to another preferred embodiment, the control unit is designed to generate a correction signal until a deviation signal is no longer emitted.

Thus, the automatic correction of the conveyor belt course is preferably performed in a closed circuit, in which the control unit determines a correction signal when a deviation signal is received and corrects the orientation of the belt drive accordingly and—if another deviation signal is present—generates a correction again and outputs it to the correction device for the change of the belt drive orientation. As soon as the conveyor belt runs again according to the target position and there is no longer an output of a deviation signal, a correction signal is also no longer generated and, thus, no change of the belt drive orientation takes place. Only when another deviation signal is generated again does a renewed determination and output of a correction signal and a corresponding change of the belt drive orientation through the correction device take place.

In particular, it can be provided that the control unit is designed to receive no deviation signal after the generation and output of a correction signal for a predetermined time period. This has the advantage that after the output of a correction signal to the correction device, and a corresponding change of the orientation of the belt drive for a predetermined time period (for example, 0 to 30 minutes, in particular 15 minutes), one can wait until a changed conveyor belt course has been established due to the change of the belt drive orientation. Only if it is determined, after the expiration of the specified time, that the change of the belt drive orientation has not been sufficient to bring the conveyor belt back into the target position is a new deviation signal received and, accordingly, a new correction signal generated and output.

Furthermore, it is preferred that the control unit be designed to receive a release signal and only to start with the reception of deviation signals as well as the generation and output of correction signals after receipt of the release signal.

In a further preferred embodiment, the correction device is designed such that for each correction signal, a change to the belt drive orientation occurs by a predetermined value in a first and/or in a second direction opposite the first. This can occur, for example, by the correction device during a predetermined time for the feed-in time of a motor, such as through a predetermined motor rotation time.

Furthermore, a limitation of the maximum change of the belt drive orientation in a first and/or second direction opposite to the first is preferred. In this way, it can be ensured that even in the case of an output of deviation signals which are repeated several times or which continue, such as due to a strongly contaminated or defective sensor, the belt drive orientation is only changed by a maximum value in order to avoid over-correction.

An especially preferred sensor arrangement is provided if the sensor is arranged with such a distance from the target position that the deviation signal is generated when the sensor detects the entry of the conveyor belt edge into a detection area. When using a forked light barrier as a sensor, this can, for example, be implemented by mounting the forked light barrier in such a way that the conveyor belt, in particular the edge of the conveyor belt, is not detected in the target course. Only when the conveyor belt deviates from the target course does the edge of the conveyor belt reach into the detection area, with a deviation signal being generated.

An alternative sensor arrangement consists of arranging the sensor in such a way that the deviation signal is generated when the sensor detects the leaving of the conveyor belt edge from a detection area.

In this arrangement, the sensor detects the conveyor belt in its target position and only outputs a deviation signal when the course of the conveyor belt has changed so much that no conveyor belt edge can be detected in the detection area of the sensor.

When an ultrasound sensor with an analog deviation signal is used, a preferred sensor arrangement can be designed in such a way that during the target course of the conveyor belt, one half of the detection area of the ultrasound sensor is covered. In this version, the analog deviation signal contains the information as to whether the conveyor belt edge moves in one or the other direction out of the middle of the detection area.

Another preferred embodiment of the conveyor is characterized by a second sensor to record a deviation of a position in another conveyor belt edge, which is designed and arranged to output a deviation signal when the position of the other conveyor belt edge deviates by a predetermined value from the target position.

Preferably, such a second sensor is designed in its functionalities and advantages like the previously described sensor or one of its further embodiments. The first and second sensor can be designed likewise or differently. Particularly preferred is a version with two forked light barrier as sensors which are arranged at the same height on the opposing sides of the conveyor in such a way that no edge is detected in the case of a target position of the conveyor belt.

Furthermore, an embodiment is preferred in which the control unit is designed to output an error message when the first and second sensor output a deviation signal. This is in particular preferred with the above described version of two forked light barriers, which each only detect a conveyor belt edge in the case of a course that deviates from the target position. In this way, it can be ensured that in the case of a deviation of the conveyor belt course at a specific function of the conveyor and its elements, only one of the two sensors generates a deviation signal. If both sensors output a deviation signal in this case, then this indicates an interruption in the system, such as a faulty or dirty sensor or a ripped conveyor belt. In such a case, it is therefore preferably provided that the control unit generate and output an error message. Furthermore, it is provided that in such a case, a change of the belt drive orientation does not occur and/or the conveyor is stopped.

In a preferred embodiment, it is further provided that the control unit is designed to change the belt drive orientation in a first or a second direction opposite of the first, dependent upon which of the two sensors outputs a deviation signal.

If two sensors are provided, in particular two forked light barriers opposite of one another, it can be determined in an especially easy manner in which direction the belt drive orientation has to be changed to correct the conveyor belt course.

An especially preferred form of further embodiment is also characterized in that two, three or several conveyor belts are each provided with a belt drive, a sensor and a correction device, whereby the two, three or several conveyor belts are preferably arranged vertically on top of one another and/or horizontally offset from one another.

High-technology stables with modern livestock systems, in particular, mostly require a plurality of conveyor belts to convey the animal products, in particular different animal products, such as eggs and feces as part of chicken farming. A particular compact and space-saving arrangement is a conveyor in which several conveyor belts are arranged vertically on top of one another. Especially preferred, for example, is an embodiment in which a plurality of conveyor belts are arranged perfectly vertically on top of each other and the belt drives as well as the correction device are also arranged perfectly vertically on top of each other, whereby, for example, the belt drives and correction devices can be arranged on a joint drive frame. Furthermore, it is possible to arrange a plurality of conveyor belts such that they are horizontally offset in relation to one another. The conveyor belts can be arranged next to each other on one horizontal level or vertically on top of each other, but in addition horizontally offset in relation to one another. Depending on the layout of the barn and the farming systems, different arrangements of the conveyor belts and belt drives of the conveyor can be preferred.

Overall, it is preferred that the plurality of conveyor belts each be designed pursuant to the above described further embodiments, just as the respective belt drive, the respective sensor and, if applicable, a second sensor as well as the respective correction device. Furthermore, a separate control unit can be allocated to each of the several conveyor belts. Alternatively, some or all of the conveyor belts can be controlled through a joint control unit.

Another preferred embodiment of the conveyor comprises a measuring unit that is designed and arranged so as to determine a load rate for the conveyor belt.

Here, the overload of the conveyor is understood as the status, in which the mass and/or amount of animal products on the conveyor belt is so large that the drive power of the belt drive is no longer sufficient to drive the conveyor belt in at least one direction. Loading the conveyor belt is understood as animal products that are moved to the conveyor belt (for example, moved to the conveyor belt by workers or for example, have fallen onto the conveyor belt by force of gravity) and are located on the conveyor belt for the further transport and/or removal.

Preferably, the conveyor belt is an endless conveyor belt with an upper run, which conveys animal products, and designed with a lower run and has, for example, a belt drive with a drive roll on the out-feed side and a return pulley on the opposite side. Assisted by pressure rolls, the conveyor belt can be pushed onto the drive roll so that a high pressing force and therefore a corresponding friction is generated between the conveyor belt and the drive roll, and the conveyor belt is driven by the rotation of the drive roll in at least one conveying direction. Preferably, the belt drive is designed as a bilaterally supported, powered drive roll. The bearings are preferably arranged in a drive housing and/or at a side or drive frame. Furthermore, scrapers can be provided for on the drive roll, which serves to clean the conveyor belt. Preferably, the conveyor belt can be driven in more than one conveying direction, such as in two conveying directions which oppose one another. The belt drive, in particular a drive roll, can preferably be designed to be able to rotate in respectively different directions. More than one belt drive can be provided for; in particular, a conveyor belt for feces can be designed to have multiple levels with at least one belt drive per level.

An adjustment mechanism can be provided for a position change of a belt drive bearing, such as in the form of an adjustment plate to house a bearing of the belt drive. As described above, this adjustment mechanism is moved, for example, by a correction device in such a way that a position change of the belt drive bearing occurs, which can cause a desired course correction of the conveyor belt.

Among other things, this further embodiment is based on the finding that for the prevention of an overload of the conveyor belt, the knowledge of a load rate of the conveyor belt is necessary. It is therefore intended to equip the conveyor with a measuring unit, with which such a load rate of the conveyor belt can be determined. Here, a load rate of the conveyor belt is understood to be a unit, from which conclusions can be drawn (directly or indirectly) regarding a, preferably current, load of the conveyor belt. The measuring unit determines a value, preferably current at the time, for the rate for the load of the conveyor belt.

The knowledge of a rate for the load of the conveyor belt, in particular the current load of the conveyor belt, is what even makes it possible to interact before the actual case of overload, shown through the standstill of the conveyor belt, and to prevent such overload, if possible. In this way, a standstill of the conveyor—and hence manual unloading of the conveyor belt—can be prevented, by initiating further transport and/or removal before an overload is reached.

Preferred examples for such a rate for the load of a conveyor belt is a power value of the belt drive, in particular a charging rate and/or the torque of the belt drive; a stretching deformation of an element of the conveyor; a force impacting on an element of the conveyor, in particular pressure and/or traction; a bearing reaction of a bearing in the belt drive; the weight of animal products located on a section of the conveyor belt; a deviation, in particular in vertical direction, a bearing of a section of the conveyor belt from an initial position; and/or a conveyor belt progress, in particular, conveyor belt speed.

Preferred examples for a measuring unit for the determination of such a rate are a force sensor, in particular a pressure sensor and/or traction sensor, such as a load cell and/or strain gauge; a torque sensor, such as a strain gauge; an ammeter; a distance sensor; and/or a conveyor belt progress detector, in particular a speed monitor and/or measuring wheel Preferably, measuring runs of the conveyor belt can be carried out outside of the actual operation of the conveyor, in order to carry out calibration of the load rate of the conveyor belt, for example and/or to determine a respectively present load of the conveyor belt. Such measuring runs are preferably carried out apart from each other and only take a short amount of time, preferably less than 10 seconds, in particular, less than 5 seconds so as not to affect the actual operation of the conveyor belt and/or the conveyor.

An embodiment of the conveyor with a control unit is particularly preferred, which is realized in that the determined load rate of the conveyor belt is compared to a set point value and preferably generates a warning message, when a predetermined deviation from the set point value is exceeded or under-run.

The control unit is preferably connected to the measuring unit by means of signal technology, in particular in order to receive a rate determined by the measuring unit for the load of the conveyor belt. Furthermore, the control unit can comprise a memory unit, in which a set point value for the load rate of the conveyor belt can preferably be stored. Such a set point value can be entered or set by an operator, for example and/or be sent to the control unit, for example by the belt drive or another apparatus. It is particularly preferred, when a set point value is derived and used from values for the load rate of the conveyor belt that have previously been determined in this (or another) conveyor and have preferably been saved and possibly further processed.

The control unit particularly serves the purpose of comparing the current value of the conveyor load rate determined by the measuring unit with a set point value, which is preferably predetermined. The set point value is preferably selected in such a way that it corresponds to such a load of the conveyor belt with animal products, at which the belt drive can still drive the conveyor belt in at least one direction, that is at which an overload of the conveyor belt has not yet occurred. When the current value for the load rate of the conveyor belt, determined by the measuring unit, now approaches the set point value and a (preferably predetermined) distance to the set point value is exceeded or under-run, the control unit generates and preferably also displays a warning message. In particular, it is preferred that such a warning message is generated, when a predetermined distance between the determined load rate of the conveyor belt and the set point value is under-run, which means that the current value moves too close to the set point value. Such an approach of the current value to the set point value indicates an imminent overload situation. By generating and preferably displaying a warning message, for example an acoustical and/or optical and/or other warning signal, which can be sent to a mobile terminal device or a computer, for example, a farmer can be enabled to intervene, in order to prevent the imminent overload situation.

It is particularly preferred that a signaling device is present for issuing the warning signal. The warning signal can be issued in the sense of a traffic light display, in order to show different stages of imminent overload. This is particularly advantageous, when such a warning message, in particular in the form of a traffic light, can be shown to the workers in charge of loading the conveyor belt, so that they can adjust the load speed or the load amount accordingly. For example in broiler fattening, this can be realized for example in the form that the workers in charge of opening the bottoms of the livestock structures, load more or fewer broilers depending on the warning message, preferably in the form of a traffic light, to the belt, in order to achieve a more or less even stream of animal products on the conveyor belt without overload.

In another embodiment, it is preferred that the measuring unit is designed to repeatedly determine the load rate of the conveyor belt, for example in regular intervals and/or event-driven and/or user-driven.

This design has the intention that the measuring unit does not only determine the load of the conveyor belt one time, but multiple times. It is particularly preferred that the determination is carried out in regular intervals, preferably automatically. For example, an automatic, regular determination of a value for the load rate of a conveyor belt can be carried out by the measuring unit in an interval of seconds, minutes, hours and/or days. Preferably, the interval can be specified by an operator. In addition, or alternatively, the determination of a load rate of the conveyor belt can occur driven by events, which means, for example, always after the start-up of the conveyor belt, before and/or after a purgation process and/or when other events occur. Another additional or alternative possibility is that an operator can initiate the determination of a preferably current value of the load rate of the conveyor belt by the measuring unit.

With such a repeated determination of the load rate of the conveyor belt, a preferably chronological development of the load rate can be derived in the control unit.

The control unit is furthermore preferably designed to compare the determined load rate of the conveyor belt with a maximum load value and to display a difference value determined by this comparison.

The maximum load value can, for example, correspond to the set point value, which is preferably predetermined. If the current value for the load rate of the conveyor belt is lower than the maximum load value, then the difference value corresponds to an additional maximum possible load. If the current value of the load rate of the conveyor belt is larger than the maximum load value, then the difference value shows the rate for the overload of the conveyor belt.

Further advantages particularly arise, when the control unit is designed to calculate a maximum additional load period from the difference value and a load value per time; and/or to calculate a maximum load value from the difference value and an additional load period.

In particular, if the difference value corresponds to the maximum possible additional load, i.e. if the calculated rate for the load of the conveyor belt is lower than the maximum load value, then this difference value can be used, in order to calculate, for how much longer the conveyor belt can be loaded at a certain load rate, before an overload occurs and/or with which load rate the conveyor belt can still be loaded for a predetermined time period, in order to also prevent overload. Here, it is also advantageous that the respective results can be issued and displayed in order to make it possible for an operator and/or co-workers to take certain coordinated measures.

Here, it is furthermore particularly preferred that the control unit is designed to save the calculated rate in the course of time and to preferably derive an average load rate of the conveyor belt per time unit, preferably in a certain time frame.

This design has the advantage that data on the change of the load rate of the conveyor belt can be saved and load rates, i.e. a load of the conveyor belt per time unit, can be derived, for example, for different time periods and different surrounding conditions. If these surrounding conditions can additionally be saved, then this data can also be used for the prognosis of future load rates under similar conditions.

If a known, determined and/or forecast anticipated additional load of animal products exceeds a previously calculated or predetermined maximum load, a warning signal is preferably generated. As described above, this warning signal can be an optical or acoustical signal or a combination of signals.

A design of the conveyor is particularly preferred in which the load rate of a conveyor belt is at least one of the following group: a power value of the belt drive, in particular a charging rate and/or the torque of the belt drive; a stretching deformation of an element of the conveyor; a force impacting on an element of the conveyor, in particular pressure and/or traction; a bearing reaction of a bearing in the belt drive; the weight of animal products located on a section of the conveyor belt; a deviation, in particular in vertical direction, a bearing of a section of the conveyor belt from an initial position; a conveyor belt progress, in particular a conveyor belt speed.

It is furthermore particularly preferred that the measuring unit is designed as a force sensor, in particular a pressure sensor and/or traction sensor, such as a load cell and/or strain gauge; a torque sensor, such as a strain gauge; an ammeter; a distance sensor; and/or a conveyor belt progress detector, in particular a speed monitor and/or measuring wheel.

In particular, combinations of measuring units and a load rate of the conveyor belt are preferred that have a respective clearance in the way that the measuring unit can calculate the respective load rate of the conveyor belt. In the following, some particularly preferred combinations of the load rate of the conveyor belt and measuring unit are listed along with their arrangement, where applicable.

A preferred embodiment of a conveyor is designed in the way that the load rate of the conveyor belt is a charging rate of the belt drive; and the measuring unit is an ammeter that is preferably designed and arranged in the way that it calculates a current of a conductor of the belt drive.

Here, it is particularly preferred to combine the measurement of the ammeter with a conveyor belt progress detector, e.g. a speed monitor, for example on a return pulley or a separate measuring wheel on the conveyor belt. Such a conveyor belt progress detector can be used as a control instrument to detect whether slack occurs. Beginning slack indicates that the calculated charging rate is no longer a direct measurement for the drive power impacting on the conveyor belt, but that a, possibly low, overload has already occurred. In the extreme case, no conveyor belt movement occurs despite high charging rate with complete slack slippage. It is not only particularly preferred to determine whether slack occurs, but also to which extent, which can be used as an indicator for the intensity of the overload.

Another preferred embodiment of a conveyor has the intention that the load rate of the conveyor belt is the torque of the belt drive; and the measuring unit comprises at least one strain gauge, which is preferably mounted to the axle journal of the belt drive.

Another preferred embodiment of a conveyor has the intention that the load rate of the conveyor belt is a bearing reaction of a bearing in the belt drive; and the measuring unit comprises at least one force sensor, which is preferably mounted to the drive roll of the belt drive.

Another preferred embodiment of a conveyor has the intention that the load rate for the conveyor belt is a deviation in vertical direction of a position of a section of the conveyor belt between two conveyor belt carriers from an initial position; and the measurement unit comprises at least one distance sensor, which is preferably arranged in vertical direction underneath the conveyor belt between to conveyor belt carriers.

Another preferred embodiment of a conveyor has the intention that the load rate of the conveyor belt is the weight of the animal products located on a section of the conveyor belt; and the measuring unit comprises at least one load cell, which is arranged on a conveyor belt carrier, in particular a conveyor belt bottom joist and/or conveyor lateral support.

Another preferred embodiment of a conveyor comprises a correction device that is designed and arranged to change the orientation of a belt drive depending on a correction signal; wherein the load rate of the conveyor belt is a traction force impacting on a correction device; and the measuring unit comprises at least one strain gauge for the determination of the traction force impacting on the correction device and preferably one conveyor belt progress detector.

According to another aspect, the initially mentioned objective is solved by a drive unit for a conveyor for conveying animal products in an agricultural business, in particular a previously described conveyor or one of its further embodiments comprising a belt drive (to drive the conveyor belt in one conveying direction), a correction device (which is designed and arranged to change the alignment of the belt drive dependent on a correction signal), and a control unit (which is designed and arranged to generate a correction signal dependent on a deviation signal and to put it out to the correction device).

The drive unit can preferably be upgraded by a measuring unit that is designed and arranged so as to determine a load rate for the conveyor belt.

Further particularly preferable embodiments of the drive units are listed in the following.

A preferred embodiment of a drive unit comprises a control unit designed to compare the determined load rate of the conveyor belt with a set point value and preferably to generate a warning message, when a predetermined deviation from the set point value is exceeded or under-run.

Another preferred embodiment of a drive unit has the intention that the measuring unit is designed to repeatedly determine the load rate of the conveyor belt, for example in regular intervals and/or event-driven and/or user-driven.

Another preferred embodiment of a drive unit provides for the control unit being designed to compare the determined load rate of the conveyor belt with a maximum load value and to display a difference value determined by this comparison.

Another preferred embodiment of a drive unit provides for the control unit being designed to calculate a maximum additional load period from the difference value and a load value per time; and/or to calculate a maximum load value from the difference value and an additional load period.

Another preferred embodiment of a drive unit provides for the control unit being designed to save the calculated rate in the course of time and to preferably derive an average load rate of the conveyor belt per time unit, preferably in a certain time frame.

Another preferred embodiment of a drive unit is designed in the way that the load rate of the conveyor belt is a charging rate of the belt drive; and the measuring unit is an ammeter that is preferably designed and arranged in the way that it calculates a current of a conductor of the belt drive.

Another preferred embodiment of a drive unit provides for the load rate of the conveyor belt being the torque of the belt drive; and the measuring unit comprising at least one strain gauge, which is preferably mounted to the axle journal of the belt drive.

Another preferred embodiment of a drive unit provides for the load rate of the conveyor belt being a bearing reaction of a bearing in the belt drive; and the measuring unit comprising at least one force sensor, which is preferably mounted to the drive roll of the belt drive.

Another preferred embodiment of a drive unit comprises a correction device that is designed and arranged to change the orientation of a belt drive depending on a correction signal; wherein the load rate of the conveyor belt is a traction force impacting on a correction device; and the measuring unit comprises at least one strain gauge for the determination of the traction force impacting on the correction device and preferably one conveyor belt progress detector.

The drive unit and its possible upgrades are particularly suited to be used together with a previously described conveyor or one of its further embodiments. The drive unit can be further embodied according to the previously described features of the conveyor and its further embodiments which apply to the drive units. In regard to the advantages, versions of embodiments and embodiment details of the drive unit and their further embodiments, reference is made to the above description in regard to the corresponding features of the conveyor.

According to another aspect, the initially mentioned objective is solved by a method for conveying animal products in an agricultural business by a conveyor, in particular a previously described conveyor or one of its further embodiments comprising the following steps: driving a conveyor belt in a conveyor by a belt drive, recording of a first position of a conveyor belt edge by a sensor, output of a deviation signal if the position of the first conveyor belt edge deviates by a predetermined value from a target position, determination of a correction signal dependent on the deviation signal by means of a control unit, output of a correction signal to a correction unit, and change of the belt drive orientation dependent on a correction signal by means of the correction device.

The method can preferably be further embodied in the step determining a load rate of the conveyor belt using a measuring unit.

Another preferred embodiment of the method is characterized in that the determined load rate of the conveyor belt is compared to a set point value and preferably a warning message is generated, when a predetermined deviation from the set point value is exceeded or under-run.

Another preferred embodiment of the method is characterized in that the load rate of the conveyor belt is repeatedly determined, for example in regular intervals and/or event-driven and/or user-driven.

Another preferred embodiment of the method is characterized in the steps: comparing the determined load rate of the conveyor belt with a maximum load value; and issuing a difference value determined by the comparison.

Another preferred embodiment of the method is characterized in the step: calculating a maximum additional load period from the difference value and a load value per time; and/or calculating a maximum load value from the difference value and an additional load period.

Another preferred embodiment of the method is characterized in the step: saving the determined load rate of the conveyor belt over the course of time; and preferably deriving an average load rate of the conveyor belt per time unit, preferably in a certain time frame.

Further advantageous embodiments of the method arise, when the load rate of a conveyor belt is determined with at least one of the following group: a power value of the belt drive, in particular a charging rate and/or the torque of the belt drive; a stretching deformation of an element of the conveyor; a force impacting on an element of the conveyor, in particular pressure and/or traction; a bearing reaction of a bearing in the belt drive; the weight of animal products located on a section of the conveyor belt; a deviation, in particular in vertical direction, a bearing of a section of the conveyor belt from an initial position; a conveyor belt progress, in particular a conveyor belt speed.

Further advantageous embodiments of the method in particular also result from the fact that for the calculation of the load rate of the conveyor belt, a measuring unit is used, which is designed as a force sensor, in particular a pressure sensor and/or traction sensor, such as a load cell and/or strain gauge; a torque sensor, such as a strain gauge; an ammeter; a distance sensor; and/or a conveyor belt progress detector, in particular a speed monitor and/or measuring wheel.

These methods and their possible further embodiments have features or, respectively, method steps which make them particularly suitable to be used with a conveyor according to the invention and its further embodiment. In regard to the advantages, versions of embodiments and embodiment details of this method and their further embodiments, reference is made in the meantime to the above description in regard to the corresponding features of the conveyor.

BRIEF DESCRIPTION OF THE DRAWINGS

Preferred embodiments of the invention are described as examples based on the attached figures. The following is shown in.

DETAILED DESCRIPTION OF THE PREFERRED EMBODIMENTS

Figure 1A:
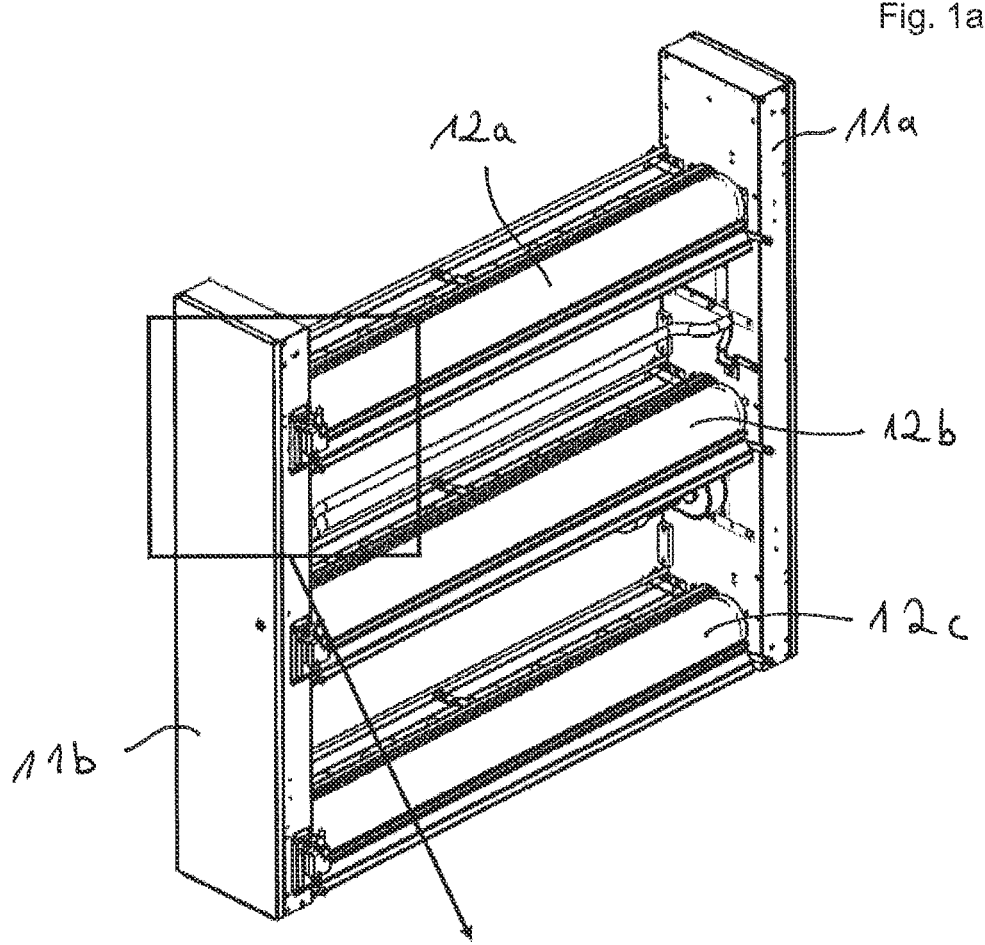
FIG. 1a is a first perspective view of three belt drives arranged on top of one another according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical charac-teristics relating to the embodiments disclosed herein are not to be considered as limiting, unless the claims expressly state otherwise.

Figure 1B:
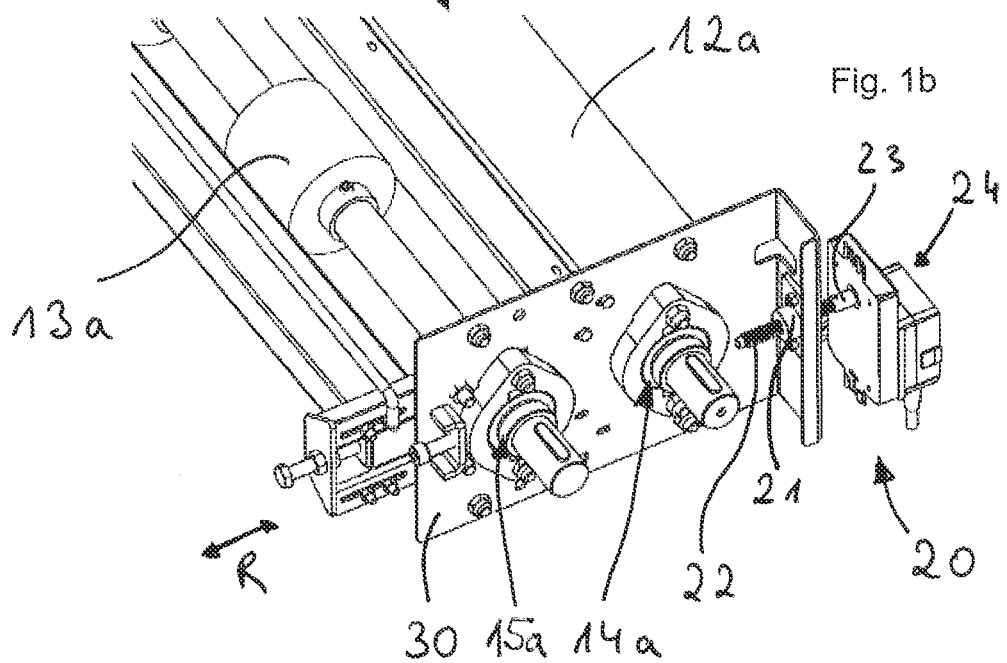
FIG. 1b is an enlarged second perspective view of a detail from FIG. 1a from a different perspective according to the invention.
Figure 2:
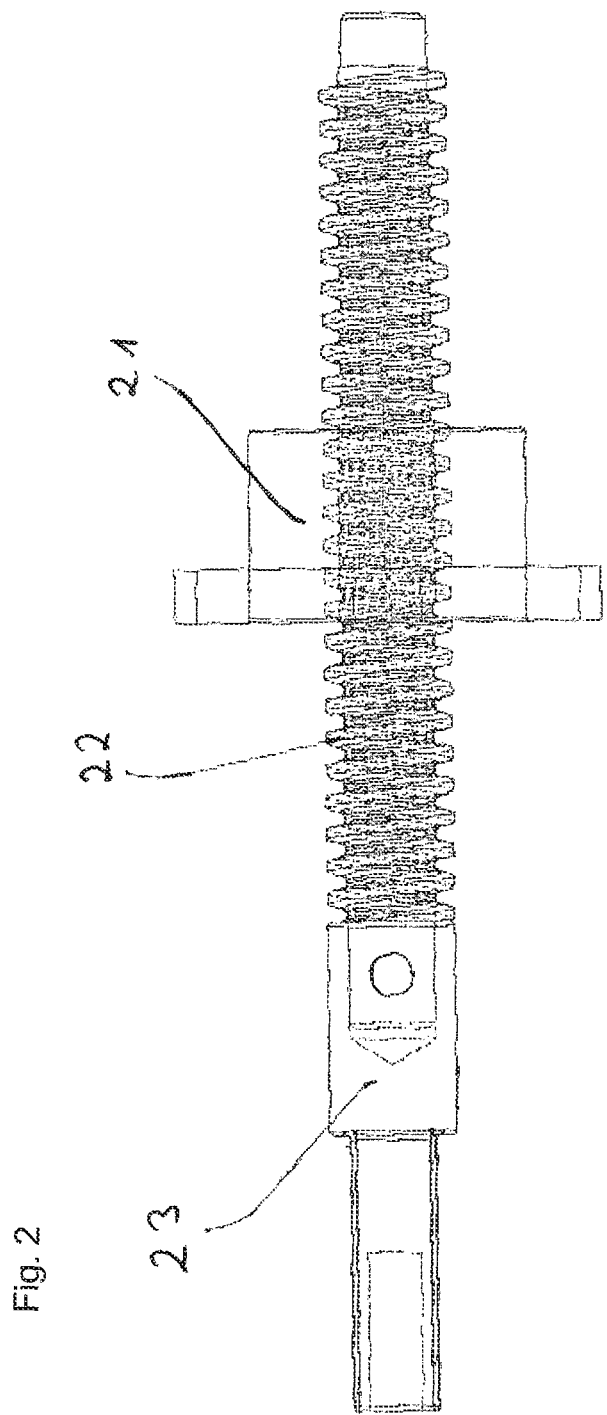
FIG. 2 is a plan view of the trapezoidal screw spindle with motor housing and flange plate of the embodiments of the correction device shown in FIG. 1b according to the invention.

Referring to FIG. 1, three belt drives 12a, 12b, 12c, which are arranged on top of each other and as bilaterally supported drive rolls. The belt drives 12a, 12b, 12c are bilaterally supported on a drive frame 11a, 11b. In FIG. 1b, it can be seen that a conveyor belt (not presented) is pressed onto the drive roll 12a by pressure rolls 13a to be driven in one conveying direction by the friction generated thereby. Both the pressure rolls 13a as well as the drive roll 12a, as can be seen in FIG. 1b, are arranged across an adjustment plate 30 such that they can move horizontally in (and opposite to) the conveying direction, as indicated by arrow R. To this end, the adjustment plate 30 has recesses to house the bearings 14a, 15a of the drive roll 12a and the pressure rolls 13a. Furthermore, a correction device 20 can be seen in FIG. 1b, which is also shown (without the motor 24) in FIG. 2. In the embodiment shown in FIG. 1b, the correction device 20 is formed by a motor 24, the rotating movement of which is implemented through a motor housing 23 and the trapezoidal thread rod 22 as linear movement to the flange plate 23 with a corresponding internal thread which engages with the trapezoidal thread rod 22. The flange plate 23 is mounted on the adjustment plate 30 such that a relative movement of the flange plate 21 in relation to the trapezoidal thread rod 22 results in a linear shift of the adjustment plate in the direction R. In this manner, the position of the bearing 14a of the belt drive 12a is shifted horizontally such that this changes the orientation of the belt drive 12a. Such a change of the orientation of the belt drive 12a can correct the course of the conveyor belt.

The control of the correction device 20 for the generation of a horizontal movement of the adjustment plate 30 to change the orientation of the belt drive 12a is performed through a correction signal generated by the control unit (not shown) and output to the correction device 20. This correction signal is generated by the control unit dependent on the deviation signal. This deviation signal is generated by a sensor and output to the control unit.

Figure 4:
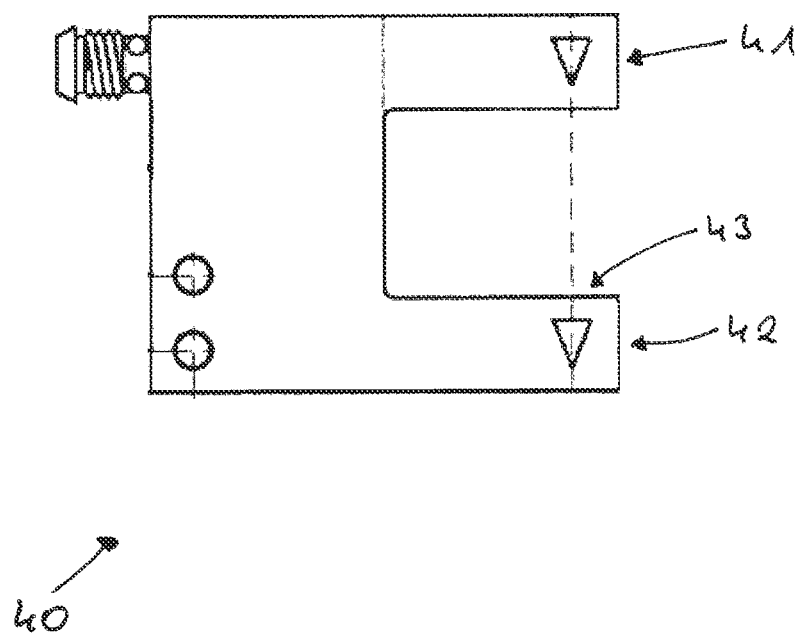
FIG. 4 is side view of a sensor designed as a forked light barrier.

A possible preferred embodiment of such a sensor is shown in FIG. 4. The sensor designed as a forked light barrier 40 has a red light laser as sensor 41 and a photo diode as receiver 42. A detection area 43 is designated which corresponds here to the area of the photo diode which the red light laser strikes. In a preferred embodiment, the forked light barrier 40 is arranged with a distance from the target position of the conveyor belt edge such that the light barrier is only interrupted if the course of the conveyor belt deviates from its target position and the conveyor belt edge breaks through the light barrier. In this case, the forked light barrier generates a corresponding deviation signal and outputs this to the control unit. If two forked light barriers are provided for on opposing conveyor belt edges, the control unit can, depending on which of the two sensors has generated the deviation signal, cause a corresponding adjustment of the adjustment plate 30 by means of the correction device 20 in or opposite to the conveying direction. If both opposing forked light barriers generate a deviation signal, the control unit outputs an error message, since this can indicate a faulty, damaged or dirty sensor or, for example, a ripped conveyor belt.

Sensor 40 is preferably arranged with an incline to the horizontal such that, in particular, the detection area 43 is inclined at an angle to the horizontal, preferably at an angle between 30 and 60 degree (for example, 45 degree). In this way, the adhesion of contaminants to the detection area can be reduced or, respectively, such contaminants can more easily slide off the detection area.

Figure 3A:
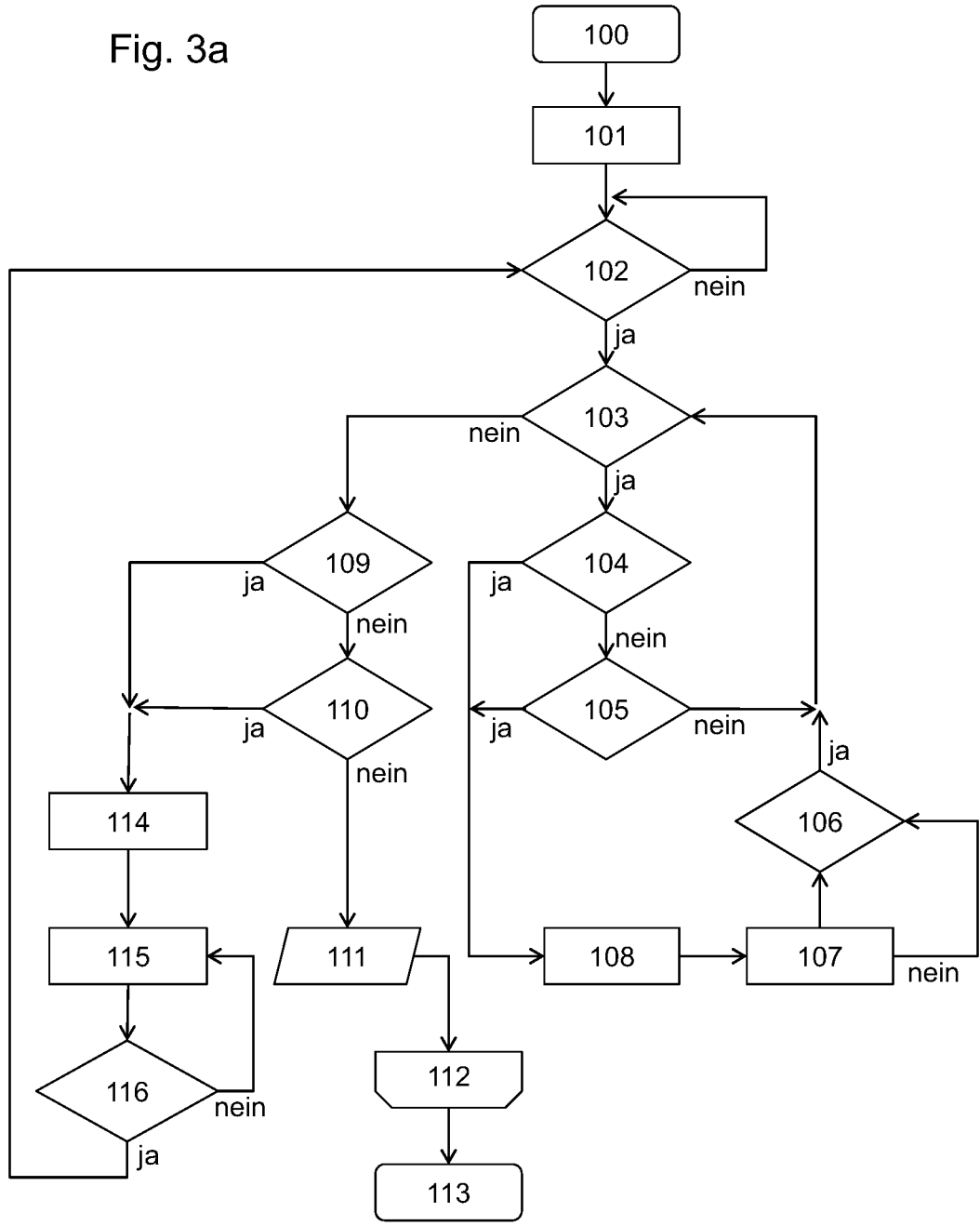
FIGS. 3a-e are various schematic flow charts of control processes according to the invention.
Figure 3B:
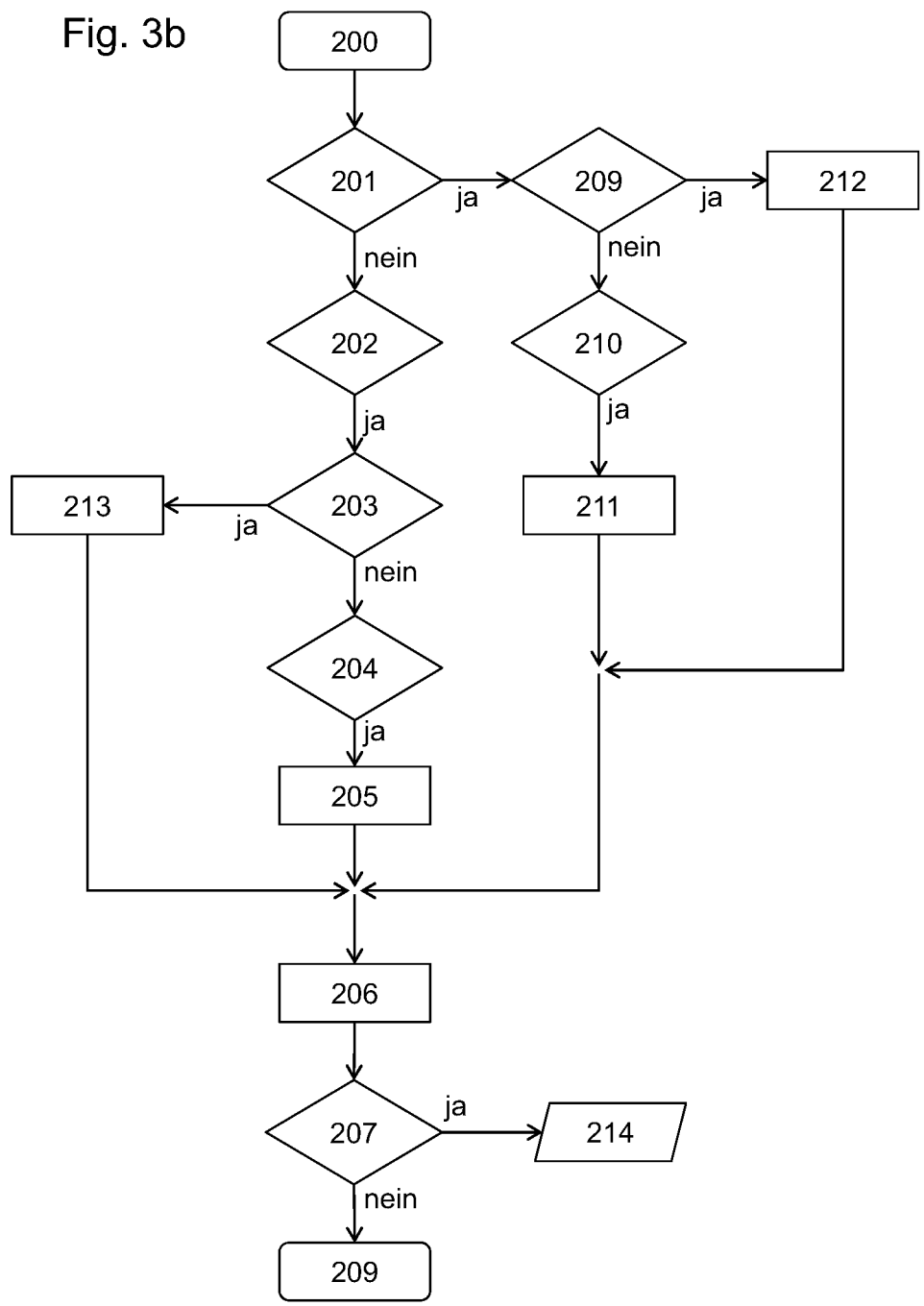
Figure 3C:
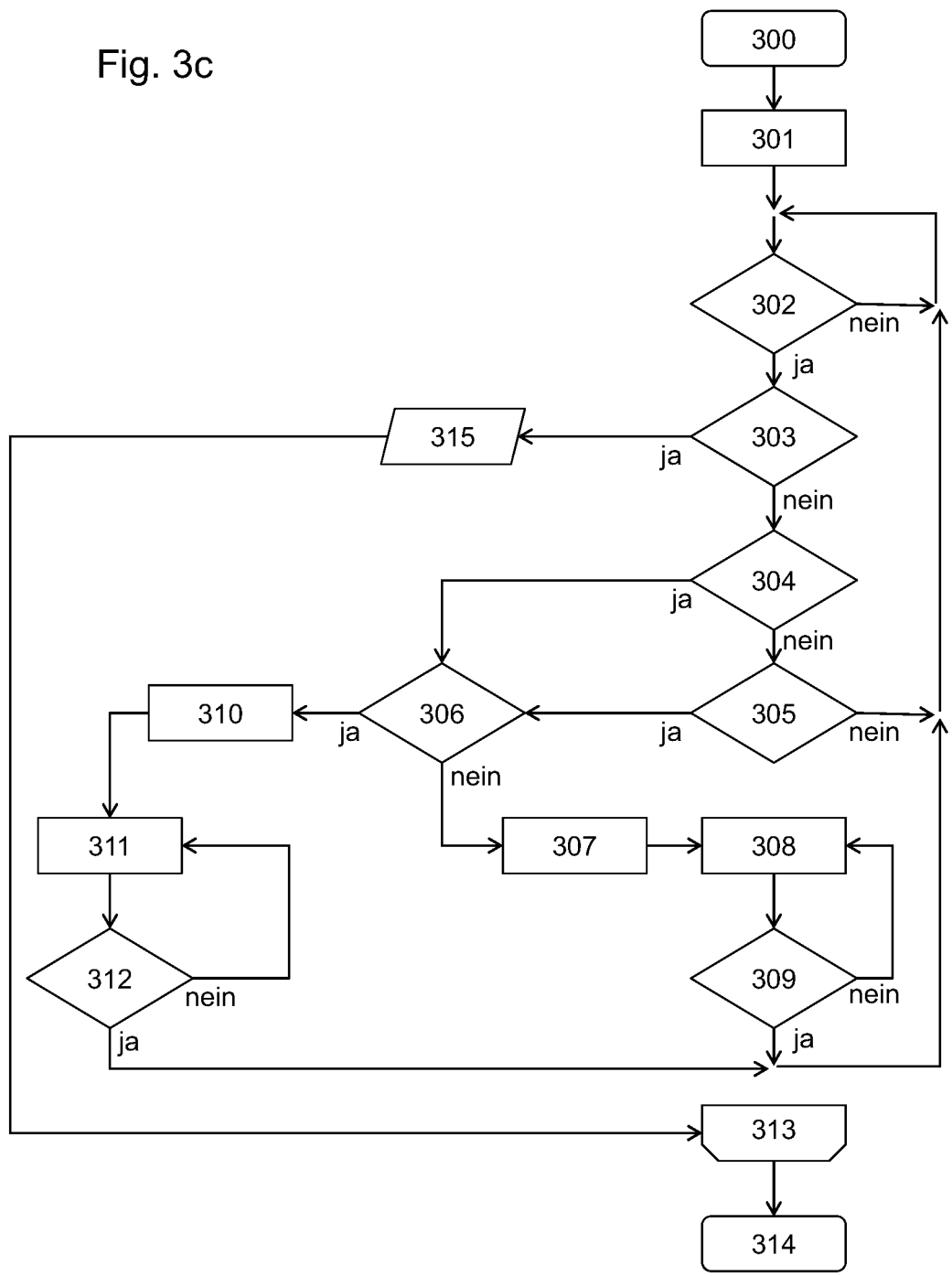
Figure 3D:
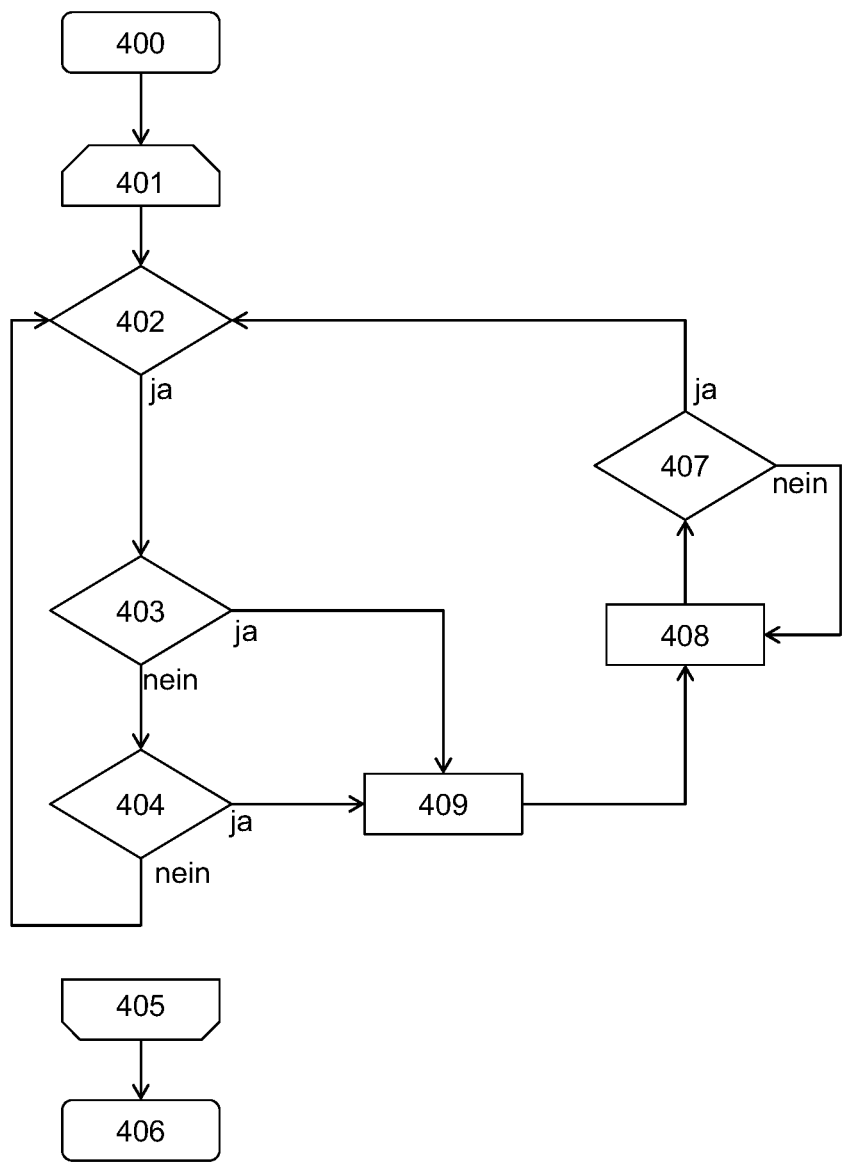
Figure 3E:
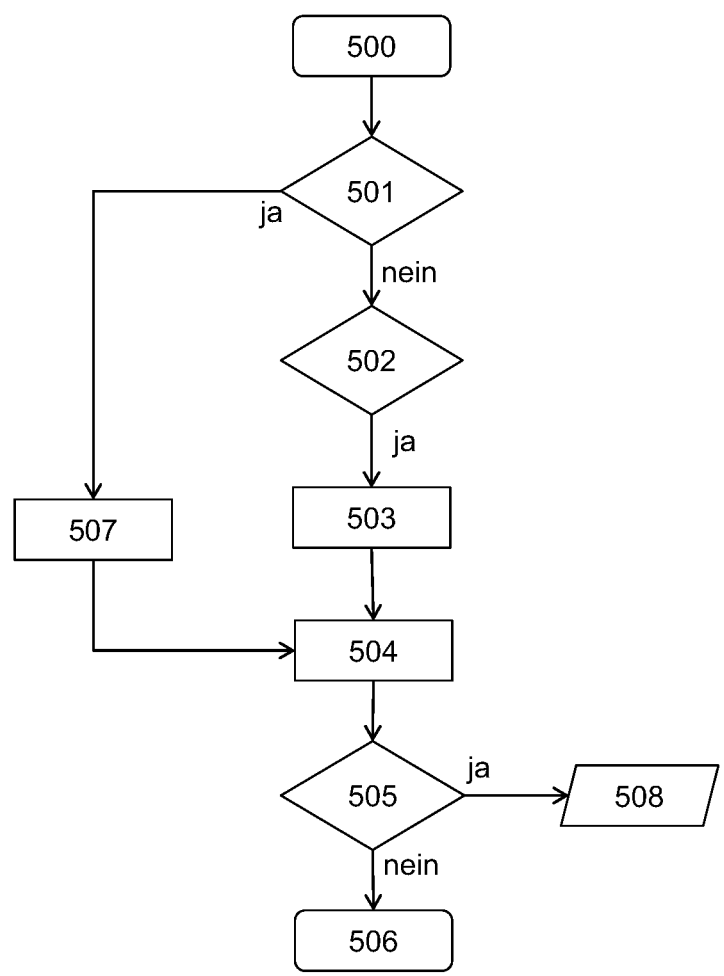

FIGS. 3a through 3e show different schematic flow diagrams for different controls. FIG. 3a shows the control of a version with inductive sensors, FIG. 3b shows the recording of the movement of adjustment plate 30, FIG. 3c shows the control of a version with two forked light barrier, FIG. 3d shows the control of a version with an ultrasound sensor and FIG. 3e shows the recording of the movement of the adjustment plate 30 for the version with the ultrasound sensor.

In the control shown in FIG. 3a, a version with inductive sensors, the control begins in step 100, even if step 101 has a system release. If this is the case, next, in step 102, it is examined if a previously established system wait time (for example, 0 to 30 minutes, in particular 15 minutes) has elapsed. If this is the case, step 103 records whether or not the sensor middle is occupied. If this is the case, steps 104, 105 examine if the sensor is also occupied on the right or the left, which indicates a deviating conveyor belt course. If this is the case, step 108 first records the prior movement of the adjustment plate 30 (as described in detail in regard to FIG. 3b) and subsequently, in step 107, a single motor rotation is performed; afterwards, in step 106, it is examined whether the necessary time for this has expired. If the inquiry as to the occupation of the sensor middle is answered with "no" in step 103, it is examined in steps 109, 110 whether the sensor is occupied on the right or on the left. If neither one nor the other is the case, an error message is output in step 111 and the control is ended through steps 112, 113. If the inquiry in steps 109, 110 shows that the sensor is occupied on the left or the right, the prior movement of the adjustment plate 30 is recorded again in step 114, and in step 115, a double rotation of the motor is caused, after which it is examined in step 116 whether the required double time for this has expired.

The recording of the prior movement of the adjustment plate 30 is shown in FIG. 3b and starts in step 200, and the subsequent inquiry as to whether a simple motor rotation has taken place occurs in step 201. If so, the inquiry follows after a motor rotation right in step 209 or, respectively, after a motor rotation left in step 210, subsequently to which a counter is increased or decreased by one in steps 211, 212 dependent on these results. If no single motor rotation takes place, a double motor rotation is concluded in step 202, and in steps 203, 204, the rotation direction is inquired and, subsequently, in steps 205, 213, the counter is accordingly increased or decreased by two. In step 206, the counter is recalculated, and in step 207, an inquiry is made as to whether the adjustment plate 30 has already reached the maximum limitation. If this is the case, the error message is output in step 214; otherwise, the recording of the movement ends in step 208.

The control for a version with two forked light barriers is performed pursuant to FIG. 3c, starting with start 300 and the system release in step 301 after an inquiry subsequent to the expiration of the waiting period in step 302 with an inquiry in step 303 as to whether both forked light barriers are active. If this is not the case, an error is output in step 315, which leads directly to the termination through steps 313 and 314. If both light barriers are active, an inquiry is made in steps 304, 305 as to whether the right or left forked light barrier is disrupted, i.e., whether a deviation signal is output. If this is the case, it is reviewed in step 306 whether the forked light barrier has already been active. If this is not the case, after the recording of the movement of the adjustment plate 30 in step 307, a single motor rotation is initiated in step 308, and in step 309, it is reviewed whether the necessary motor rotation time for this has expired. If the forked light barrier has already been active, then after the recording of the movement of the adjustment plate 30 in step 310, a double motor rotation is initiated in step 311, and in step 312, it is inquired as to whether the necessary double motor rotation time for this has expired. The recording of the movement of the adjustment plate 30 can take place as described in FIG. 3b.

FIG. 3d describes the control in a version with an ultra sound sensor. After the start in step 400, the system release in step 401 and the inquiry in step 402 as to whether the system waiting time has expired, a voltage inquiry is performed in steps 403, 404, corresponding in this case to the deviation signal. If a voltage of under 4 volts is determined in step 403, the movement of the adjustment plate 30 is recorded in step 409, as is shown hereafter in regard to FIG. 3e in detail. Subsequently, a motor rotation is caused in step 408 and, in step 407, it is examined as to whether the necessary rotation time for this has expired. If a voltage of 6 volts is exceeded in step 404, the process is continued pursuant to steps 409, 408 and 407. If the inquiries in steps 403 and 404 show that the voltage is between 4 and 6 volts, no deviation signal is output and the system waits for the expiration of the system waiting time for the next inquiry.

FIG. 3e shows the recording of the movement of adjustment plate 30 for the version with an ultra sound sensor. After the start 500, it is recorded in step 501 whether a motor rotation right has taken place or if, in step 502, a motor rotation to the left has occurred. Depending upon whether the motor rotation took place to the right or the left, in steps 507, 503, a counter is increased or decreased by one. In step 504, the corresponding counter reading is determined and, in step 505, it is review if the adjustment plate 30 is already in its maximum position, i.e., if the limitation has been achieved. If this is the case, step 508 outputs the error message; otherwise, the recording ends in step 506.

FIGS. 5 to 10 show different further exemplary embodiments of a conveyor according to the invention. Equal or essentially equal elements or respectively elements with equal or respectively essentially equal functions are described in the different figures with equal reference signs, partially with a following "'".

Figure 5:
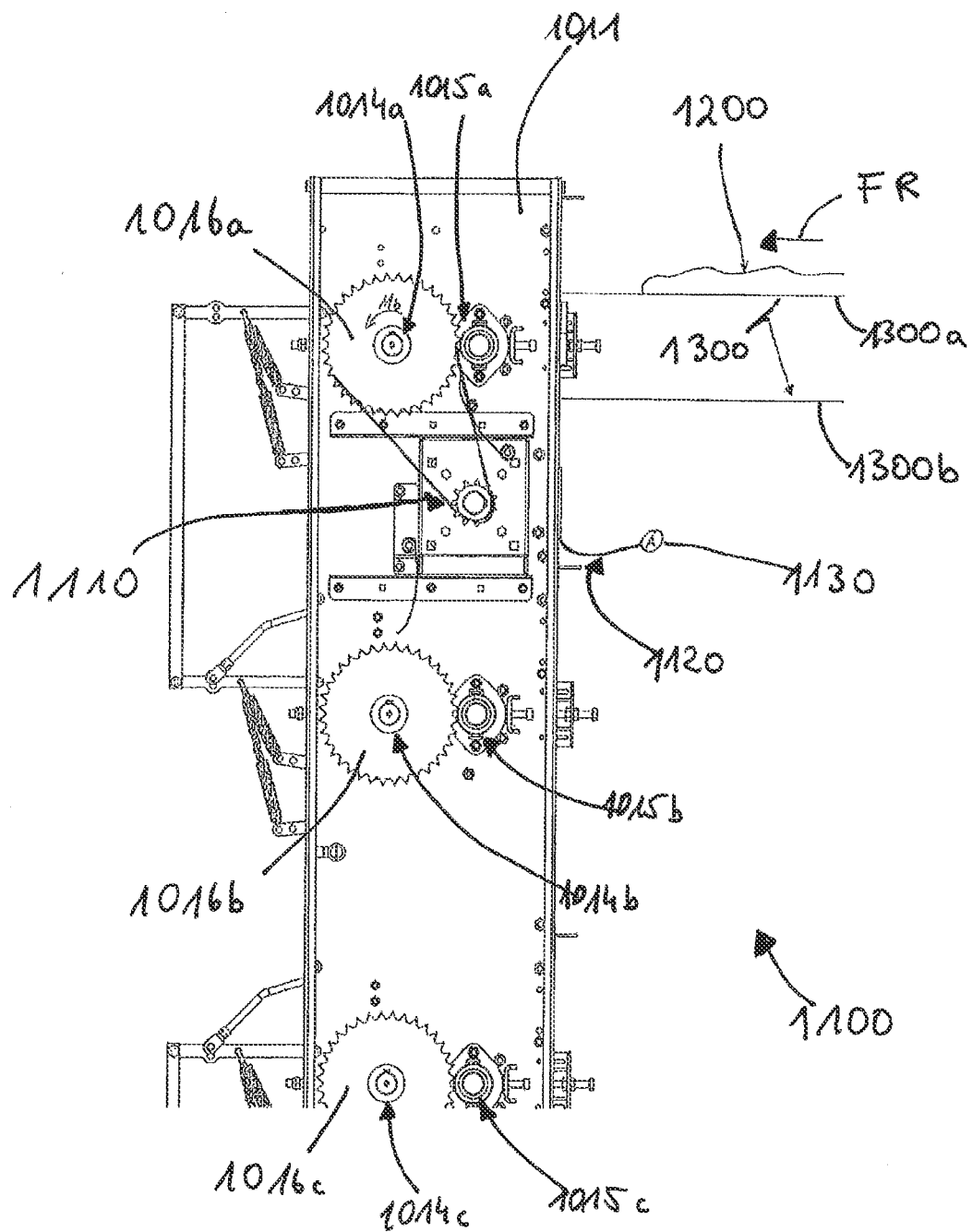
FIG. 5 is a partial side view of a first further exemplary embodiment of a conveyor according to the invention.

In FIG. 5, a partial view of a first further exemplary embodiment of a conveyor 1100 according to the invention is shown. A drive frame 1011 can be seen, with three bearings 1014a, 1014b, 1014c arranged on top of each other in vertical direction, for the bearing of three equally vertically on top of each other arranged belt drives, which serve the purpose of driving three equally vertically on top of each other arranged conveyor belts. On bearings 1015a, 1015b, 1015c, pressure rolls are located, which press the conveyor belt of the respective level to the respective drive roll, in order to transfer the drive power to the conveyor belt. In FIG. 5, only the top one of these three conveyor belts 1300 of the three-level design conveyor 1100 is shown.

The conveyor belt 1300 is designed with an upper run 1300a and a lower run 1300b. The upper run 1300a is loaded with animal products, here feces 1200, while the conveyor belt 1300 is driven by the belt drive in the way that the feces can be moved in one conveying direction CD. The conveyor belt 1300 is pressed to the drive roll by pressure rolls that are supported at the bearing 1015a, in order to be driven by the friction, which is thus created in the conveying direction CD.

The bearing 1014a is connected to a sprocket 1016a, which can be driven by a motor via a chain and thus torque Mb is transferred to the belt drive, which then drives the conveyor belt 1300 in the conveying direction CD.

As for the load rate of the conveyor belt 1300 with animal production, here feces 1200, a motor current monitoring is used in the embodiment according to FIG. 5, i.e. the recorded current of the drive motors 1110 is determined in the conductor 1120 with a current measuring device 1130. From this recorded motor current, the torque Mb can be determined, which is needed in order to move the conveyor belt 1300. With increasing load of the conveyor belt 1300, the torque Mb necessary for the drive of the conveyor belt 1300 increases together with recorded motor current. If the characteristic of the drive motor 1110 is known, then the difference to a maximum torque can be calculated from the necessary torque currently recorded from the motor current, and from this difference, a maximum possible additional load can be calculated, if applicable with a safety margin, with which the conveyor belt 1300 can be additionally loaded, and simultaneously a reliable drive of the conveyor belt through the belt drive can be secured. If the maximum torque is exceeded, a standstill of the conveyor belt 1300 with the corresponding disadvantages can occur.

Preferably, a warning message is issued, if the currently necessary torque, which can be calculated from the currently recorded motor current, under-runs a predetermined distance from the maximum torque, so that the animal products located on the conveyor belt 1300 can be removed, before an overload of the conveyor belt 1300 occurs.

In particular, it is preferred to combine the measurement of the ammeter in a current measuring device 1130 with a conveyor belt progress detector, e.g. a speed monitor, for example on a return pulley or a separate measuring wheel on the conveyor belt 1300, in order to ensure that slack is detected. Beginning slack indicates that the calculated charging rate is no longer a direct measurement for the drive power impacting on the conveyor belt, but a, possibly low, overload has already occurred.

A further possibility to determine the traction force of the conveyor belt consists for example in that one or multiple strain gauges are arranged, for example, between the bearing of a drive roll or the belt drive and the supporting lateral or drive frame 1011, in order to directly determine the traction forces there.

Figure 6:
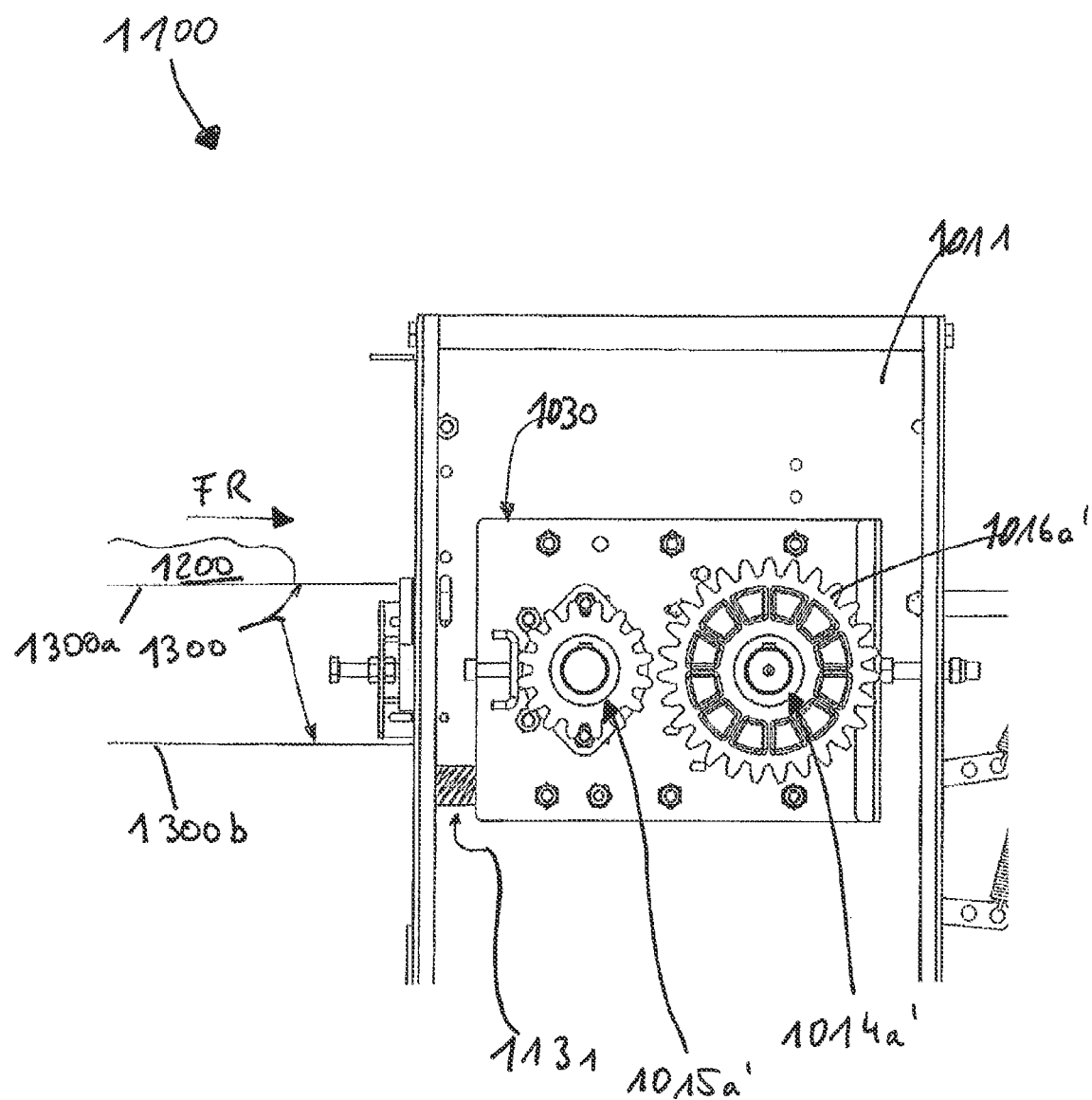
FIG. 6 is a partial side view of a second further exemplary embodiment of a conveyor according to the invention.

Another possible embodiment of a conveyor according to the invention 1100 is shown in FIG. 6. FIG. 6 shows an embodiment of a conveyor 1100 similar to the one previously described. The previously described conveyor 1100 has an automatic conveyor belt control, which controls the fault-free straight running of the conveyor belts. Here, both the pressure rolls 13a as well as the drive roll 12a, as can be seen in FIG. 1b, are arranged across an adjustment plate 1030 so that they can move horizontally in and opposite to the conveying direction CD via the bearings 1015a' and 1014a'. The adjustment plate 1030 is preferably connected to a servo motor or respectively a correcting device, in order to be able to shift the adjustment plate 1030 horizontally with the bearings 1014a', 1015a'.

According to the embodiment of FIG. 6, a bearing reaction of the bearing 1014a' of the belt drive can be used as the load rate of the conveyor belt, wherein the corresponding measuring unit 1131 is preferably designed as a force sensor, which is arranged at a bearing 1014a' of a drive roll of the belt drive, specifically indirectly above the adjustment plate 1030. Since there is a side or a drive frame 1011 on both sides of the conveyor with each one adjustment plate 1030 and respective bearings 1014a', 1015a' for the drive roll and the pressure rolls, each one force can be determined in the respective force sensors 1131, which corresponds to half of the traction force Fz of the conveyor belt 1300. The resulting traction force of the conveyor belt 1300 therefore occurs, divided by the factor of 2, at the bearings 1014a' of the drive roll of the belt drive and can be recorded via the force sensors 1131. In a control unit (not shown), the values determined by the force sensors 1131 can be evaluated in order to facilitate a conclusion regarding the load of the conveyor belt 1300 with animal products.

Alternatively, the traction forces to be determined can also be recorded via a strain gauge at the servo motor of the adjustment plate 1030. Here, the connection with a conveyor belt progress detector is also preferred. In this way, the currently working traction forces can be determined in a reliable way and processed in a control unit, in order to determine a load rate of the conveyor belt and thus realize the advantages described above.

Figure 7:
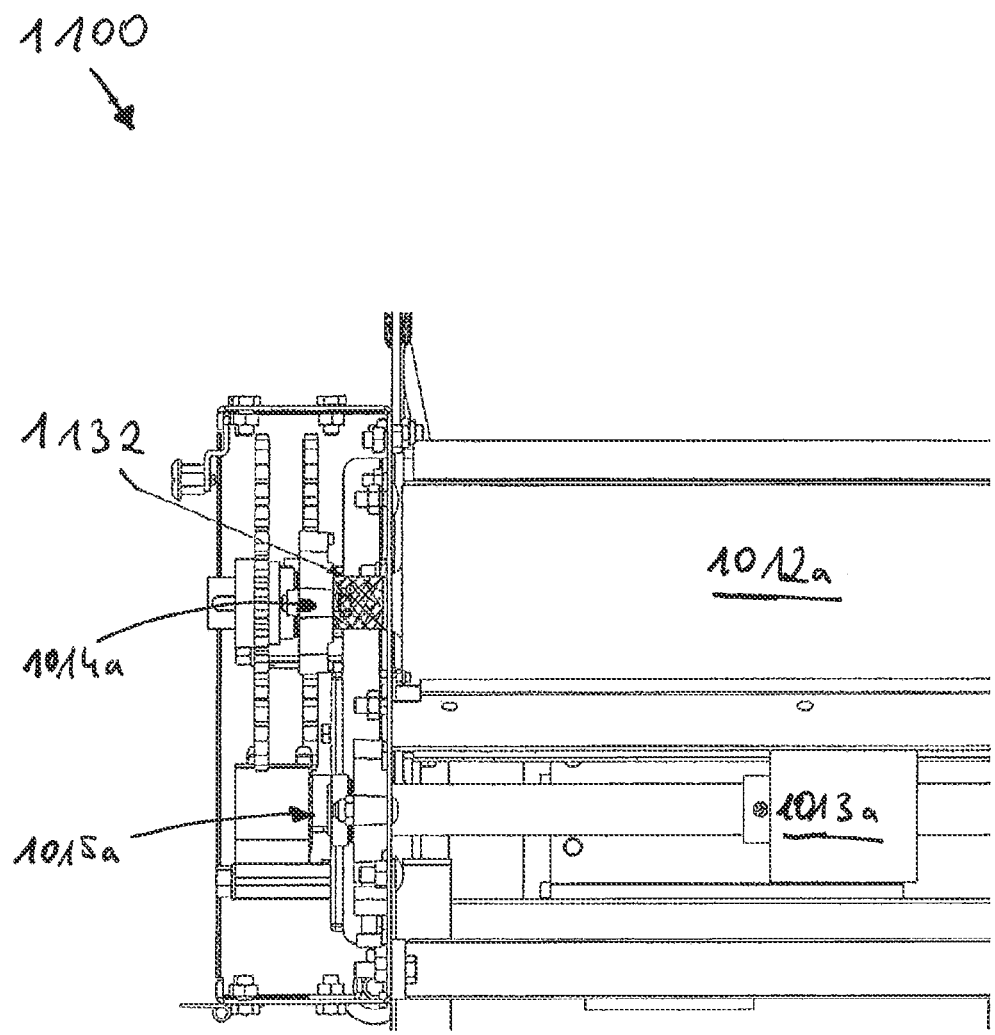
FIG. 7 is a partial front view of a third further exemplary embodiment of a conveyor according to the invention.

In FIG. 7, another possible embodiment of a conveyor according to the invention 1100 is shown. In the partial view of FIG. 7, the drive roll 1012 supported at the bearing 1014a as well as a drive roll 1013a supported at the bearing 1015a can be seen. In the variation shown in FIG. 7, a torque is used as a load rate of the conveyor belt, wherein the measuring unit is designed as a strain gauge 1132, which is arranged at an axle journal of the drive roll 1012a of the belt drive.

In this variation, the evaluation possibilities mentioned above can also be connected to the equally previously mentioned advantages.

Figure 8:
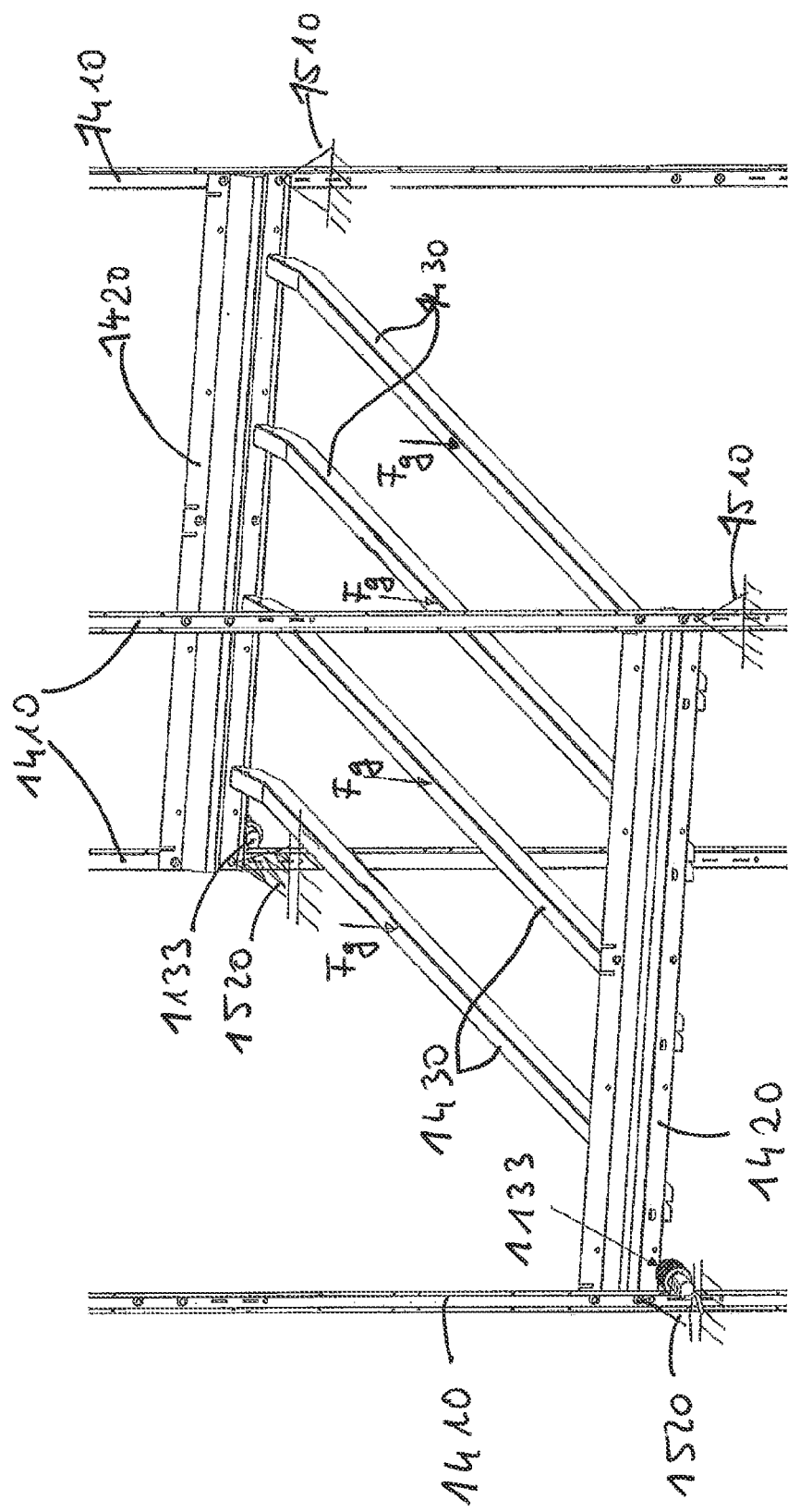
FIG. 8 is a perspective view of a support structure of another exemplary embodiment of a conveyor according to the invention.
Figure 9:
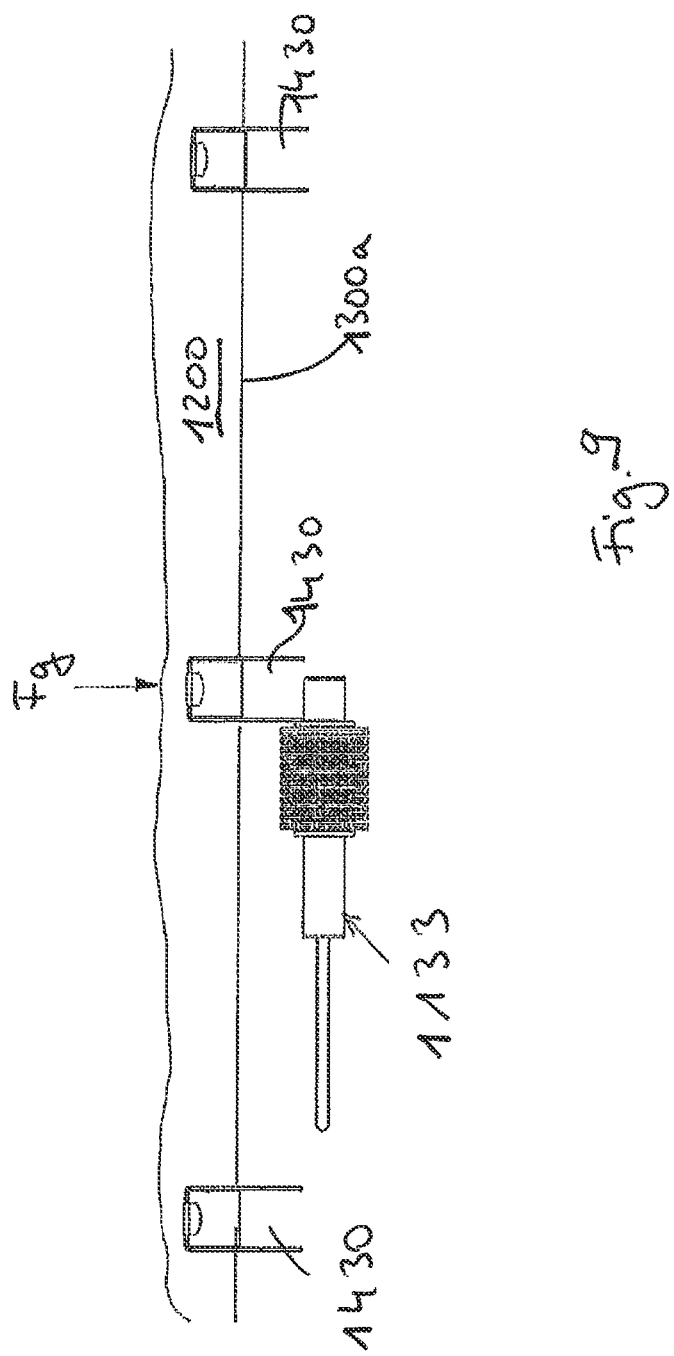
FIG. 9 is a partial cross-section of a variation of the embodiment shown in FIG. 8 according to the invention.

In FIGS. 8 and 9, variations are shown, in which a weight of the animal products located on a section of the conveyor belt is used for the load rate of the conveyor belt. Here, the measuring unit is designed to be a load cell 1133. In FIG. 8, two conveyor belt side supports 1420 are mounted to vertical stands 1410 via fixed bearings 1510 and respectively via movable bearings 1520. At the conveyor belt side supports 1420 in turn, conveyor belt bottom joists 1430 are mounted, on which the conveyor belt (not shown in FIG. 8) runs. The weight force of the animal products Fg to be transported on the upper run of the conveyor belt impacts on the conveyor belt bottom joists 1430. Via the mounting of the conveyor belt bottom joist 1430 on the conveyor belt side supports 1420, this weight force Fg is transferred to the movable bearings 1520, at which each one load cell 1133 is arranged, which can record the respective weight forces.

In the variation shown in FIG. 9, one or preferably two load cells 1133 are arranged under at least one of the bottom joists 1430, which can directly record the weight force Fg there.

Here, after recording the weight as load rate of the conveyor belt, another evaluation and processing follows as well, preferably in a not-shown control unit in the way described above with the also described advantages.

Figure 10:
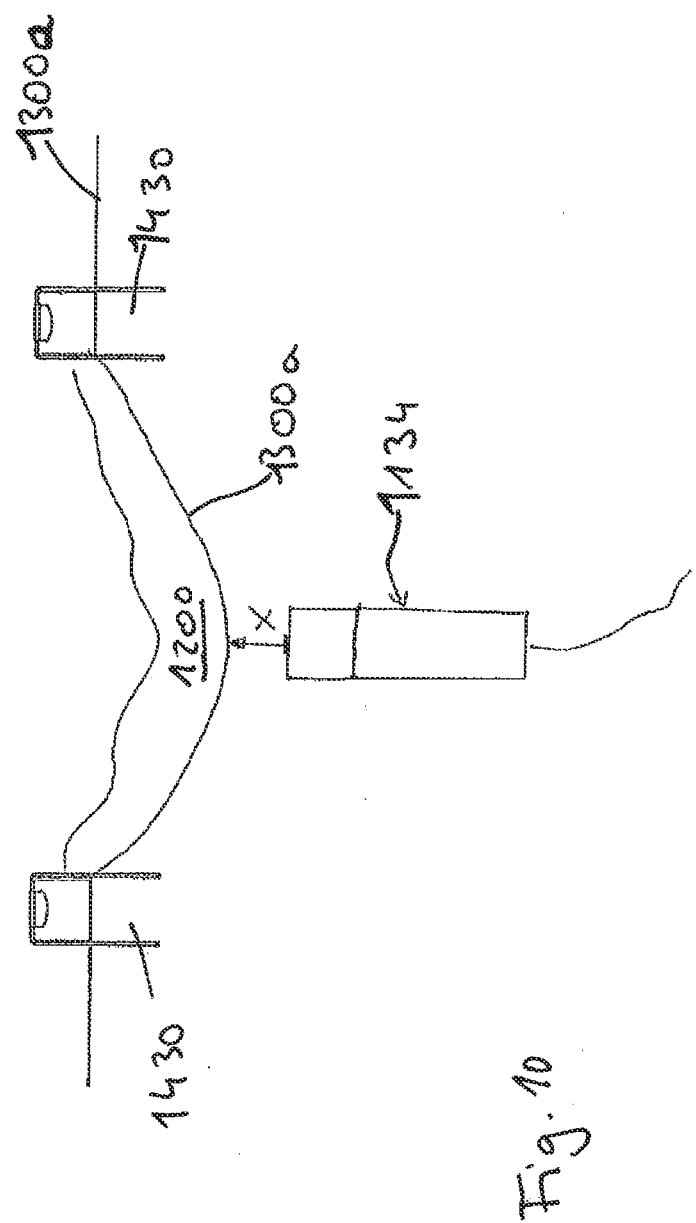
FIG. 10 is a partial cross-section of a further exemplary embodiment of a conveyor according to the invention.

In FIG. 10, another variation is shown, in which a deviation in vertical direction from a position of a section of the conveyor belt 1300, in particular of the upper run 1300a, between two conveyor belt carriers, here conveyor belt bottom joists 1430, from an initial position is used for the load rate of the conveyor belt. The measuring unit is embodied in the variation shown in FIG. 10 as a distance sensor 1134, which is arranged in vertical direction beneath the lower run 1300a of the conveyor belt between two conveyor belt carriers, here conveyor belt bottom joists 1430. The initial position of the lower run 1300a of the conveyor belt can be seen in FIG. 10 on the right and left side of the conveyor belt bottom joists 1430. The distance sensor 1134, however, measures between the two conveyor belt bottom joists 1430 only a distance X to the lower run 1300a of the conveyor belt in the middle between the two conveyor belt bottom joists 1430. Compared to the initial position of the upper run 1300a of the conveyor belt, to be seen on the right and left side of the conveyor belt bottom joists, there is therefore a deviation between the bottom joists 1430 in vertical direction of the position of the section of the conveyor belt from this initial position. This deviation can also be described as sagging. With increasing load of the conveyor belt with animal products 1200, this sagging increases, which means that the distance x measured by the distance sensor 1134 to the upper run 1300a of the conveyor belt decreases.

After the determination of the load rate of the conveyor belt, the position deviation, the described evaluation and further processing steps can follow, such as issuing warning messages and/or calculations of further possible maximum loads, load rates and/or load times, in this variation as well. By way of these evaluations and further processing steps, measures can be facilitated for a farmer or operators of agricultural businesses and the employees that work there that can counteract and prevent an overload of a conveyor belt at an early point in time. In this way, disadvantageous situations with loaded, but no longer conveying-capable conveyor belts can be avoided and/or reduced.

It is to be understood that variations and modifications can be made on the aforementioned structure and method without departing from the concepts of the present invention, and further it is to be understood that such concepts are intended to be covered by the following claims unless these claims by their language expressly state otherwise.

The invention claimed is:

1. A conveyor to convey animal products in an agricultural business, comprising:
   a conveyor belt having a belt edge having a position;
   a belt drive adapted to drive the conveyor belt in at least one conveying direction;
   a first sensor adapted to detect the position of the conveyor belt edge, the sensor designed and arranged to output a deviation signal when the position of the conveyor belt edge deviates by a predetermined value from a target position,
   a correction device designed and arranged to change the orientation of the belt drive dependent on a correction signal;
   a measuring unit designed to determine a load rate of the conveyor belt; and
   a control unit designed to generate the correction signal dependent on the deviation signal and to output it to the correction device, wherein the control unit is designed to compare the determined load rate of the conveyor belt with a set point value, compare the determined load rate of the conveyor belt with a maximum load value, and display a difference value determined by this comparison, wherein the control unit further determines a maximum additional load period from the difference value and a load value per time.

2. The conveyor according to claim 1, wherein the belt drive is a bilaterally supported, powered drive roll and the correction device is designed and arranged to change the orientation of the belt drive through a position change of a bearing of the belt drive in a horizontal direction either toward or away from the conveying direction.

3. The conveyor according to claim 1, wherein the first sensor generates either digital or analog deviation signal and is selected from the group consisting of an optical, an acoustic, a mechanical, a capacitive, or an inductive sensor.

4. The conveyor according to claim 3, wherein the first sensor is arranged in such a way that a detection area of the first sensor is arranged on an incline.

5. The conveyor according to claim 3, wherein the first sensor is arranged relative the target position such that the deviation signal is generated when the first sensor detects the entry of the conveyor belt edge into a detection area.

6. The conveyor according to claim 3, wherein the sensor is arranged relative the target position such that the deviation signal is generated when the sensor detects the absence of the edge of the conveyor belt in the detection area.

7. The conveyor according to claim 1, wherein the correction device is designed to change, for each correction signal, the orientation of the belt drive by a predetermined value in either or both of a first direction coincident with the conveying direction and a second direction opposite the conveying direction.

8. The conveyor of claim 7, wherein the change in the orientation of the belt drive is limited in the maximum allowable change in each of the first and second directions.

9. The conveyor according to claim 1, further comprising a second sensor for detecting a position of a second edge of the conveyor belt designed and arranged so as to output a deviation signal when the position of the second edge of the conveyor belt deviates by a predetermined value from a target position, wherein the control unit is designed so as to output an error message if the first and the second sensor issue a deviation signal.

10. The conveyor according to claim 1, further comprising a second sensor for detecting a position of a second edge of the conveyor belt designed and arranged so as to output a deviation signal when the position of the second edge of the conveyor belt deviates by a predetermined value from a target position, wherein the control unit is designed to change the orientation of the belt drive either toward or away from the conveying direction depending on which one of the first and second sensor outputs the deviation signal.

11. The conveyor according to claim 1, further comprising a plurality of conveyor belts, each provided with a belt drive, a sensor, and a correction device, whereby the plurality of conveyor belts are arranged vertically on top of one another.

12. The conveyor according to claim 1, further comprising a plurality of conveyor belts, each provided with a belt drive, a sensor, and a correction device, whereby the plurality of conveyor belts are arranged horizontally offset from one another.

13. A conveyor to convey animal products in an agricultural business, comprising:
   a conveyor belt having a belt edge having a position;
   a belt drive adapted to drive the conveyor belt in at least one conveying direction;
   a first sensor adapted to detect the position of the conveyor belt edge, the sensor designed and arranged to output a deviation signal when the position of the conveyor belt edge deviates by a predetermined value from a target position,
   a correction device designed and arranged to change the orientation of the belt drive dependent on a correction signal;
   a measuring unit designed to determine a load rate of the conveyor belt; and
   a control unit designed to generate the correction signal dependent on the deviation signal and to output it to the correction device, wherein the control unit is designed to compare the determined load rate of the conveyor belt with a set point value, and the control unit is designed to generate a warning message if a predetermined deviation from the set point value is exceeded or under-run, compare the determined load rate of the conveyor belt with a maximum load value, and display a difference value determined by this comparison, wherein the control unit further determines a maximum additional load period from the difference value and a load value per time.

14. The conveyor of claim 13, wherein the measuring unit is designed to repeatedly and intermittently determine the load rate of the conveyor belt.

15. The conveyor according to claim 13, wherein the control unit is designed to save the determined load rate in the course of time and to derive an average load rate of the conveyor belt per time unit within a predetermined time frame.

16. The conveyor according to claim 13, wherein the load rate of the conveyor belt is determined from a group of measurable physical phenomena consisting of:
   a power value of the belt drive, including a charging rate and/or torque of the belt drive;
   a stretching deformation of an element of the conveyor;
   a force impacting on an element of the conveyor, including pressure and/or traction force;
   a bearing reaction of a bearing of the belt drive;
   the weight of a section of the conveyor belt;
   a deviation, including in the vertical direction, of a position of a section of the conveyor belt from an initial position; and
   conveyor belt progress, including a conveyor belt speed.

17. The conveyor according to claim 13, wherein the measuring unit is selected from the group consisting of:
   a force sensor, including pressure sensors, traction sensors, load cells, and strain gauges;
   a torque sensor, including a strain gauge;
   a current measuring device;
   a distance sensor; and
   a conveyor belt progress detector, including a belt speed monitor and measurement wheel.

18. A drive unit for a conveyor to convey animal products in an agricultural business, wherein the conveyor comprises:
   a belt drive to drive a conveyor belt in a conveying direction;
   a correction device designed and arranged to change the orientation of the belt drive dependent on a correction signal;
   a measuring unit designed to determine a load rate of the conveyor belt; and
   a control unit designed to generate a correction signal dependent on a deviation signal and to output the deviation signal to the correction device, wherein the control unit is designed to compare the determined load rate of the conveyor belt with a set point value, wherein the control unit compares the determined load rate of the conveyor belt with a maximum load value and displays a difference value determined by this comparison, and wherein the control unit further determines a maximum additional load period from the difference value and a load value per time.

19. A method for conveying animal products in an agricultural business with a conveyor, wherein the conveyor comprises:
- a belt drive to drive a conveyor belt in a conveying direction;
- a correction device designed and arranged to change the orientation of the belt drive dependent on a correction signal;
- a control unit designed to generate a correction signal dependent on a deviation signal and to output the deviation signal to the correction device; and
- a measuring unit designed and arranged to determine a load rate of the conveyor belt, wherein the control unit compares the determined load rate of the conveyor belt with a maximum load value and displays a difference value determined by this comparison, and wherein the control unit further determines a maximum additional load period from the difference value and a load value per time, and wherein the method comprises the steps of:
- driving the conveyor with the belt drive in at least one conveying direction;
- recording a deviation in a first position of a conveyor belt edge by way of a sensor;
- outputting a deviation signal when the position of the first conveyor belt edge deviates by a predetermined value from a target position;
- determining a correction signal dependent on the deviation signal by a control unit;
- outputting the correction signal to a correction device;
- changing the orientation of the belt drive through a correction device dependent on the correction signal; and
- determining a load rate of the conveyor belt using a measuring unit.

* * * * *